(12) United States Patent
Lu et al.

(10) Patent No.: US 8,977,041 B2
(45) Date of Patent: Mar. 10, 2015

(54) SYSTEMS AND METHODS FOR CREATING A VISUAL VOCABULARY

(75) Inventors: Juwei Lu, Irvine, CA (US); Bradley Scott Denney, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/592,148

(22) Filed: Aug. 22, 2012

(65) Prior Publication Data
US 2014/0056511 A1    Feb. 27, 2014

(51) Int. Cl.
*G06K 9/62* (2006.01)

(52) U.S. Cl.
USPC .......... 382/159; 382/224; 382/225; 382/190; 382/168

(58) Field of Classification Search
CPC ... G06K 9/6256; G06K 9/66; G06K 9/00664; G06K 9/6218; G06F 17/30265; G06T 2207/10016; G06T 5/40
USPC .......................... 382/159, 224–225, 190, 168
See application file for complete search history.

(56) References Cited

U.S. PATENT DOCUMENTS

2013/0132377 A1*  5/2013  Lin et al. ........................ 707/723

OTHER PUBLICATIONS

Gemert et al: "Visual word ambiguity", PAMI-IEEE, 2010.*
Zhang et al: "A large scale clustering scheme for kernel K-means", IEEE, 2002.*
Christopher M. Bishop et al., Generative or Discriminative? Getting the Best of Both Worlds, Bayesian Statistics 8, pp. 3-24, Oxford University Press, 2007.
Anna Bosch et al., Scene Classification Using a Hybrid Generative/Discriminative Approach, IEEE Transactions on Pattern Analysis and Machine Intelligence, vol. 30, No. 4, Apr. 2008.
Alex D. Holub et al., Hybrid Generative-Discriminative Visual Categorization, International Journal of Computer Vision (IJCV), 2007.
Svetlana Lazebnik et al., Supervised Learning of Quantizer Codebooks by Information Loss Minimization, IEEE Transactions on Pattern Analysis and Machine Intelligence, vol. 31, No. 7, Jul. 2009.
Y. Li et al., A Generative/Discriminative Learning Algorithm for Image Classification, 2005.
Shuang Hong Yang et al., Hybrid Generative/Discriminative Learning for Automatic Image Annotation, UAI '10: Proceedings of the 26th Conference on Uncertainty in Artificial Intelligence, 2010.
Shiliang Zhang et al., Building Contextual Visual Vocabulary for Large-scale Image Applications, MM'10, Oct. 25-29, 2010, Firenze, Italy.

(Continued)

*Primary Examiner* — Ruiping Li
(74) *Attorney, Agent, or Firm* — Canon U.S.A., Inc. IP Division

(57) ABSTRACT

Systems and methods for generating a visual vocabulary build a plurality of visual words via unsupervised learning on set of features of a given type; decompose one or more visual words to a collection of lower-dimensional buckets; generate labeled image representations based on the collection of lower dimensional buckets and labeled images, wherein labels associated with an image are associated with a respective representation of the image; and iteratively select a sub-collection of buckets from the collection of lower-dimensional buckets based on the labeled image representations, wherein bucket selection during any iteration after an initial iteration is based at least in part on feedback from previously selected buckets.

18 Claims, 17 Drawing Sheets

(56) References Cited

OTHER PUBLICATIONS

G. Carneiro et al., Supervised Learning of Semantic Classes for Image Annotation and Retrieval, IEEE Transactions on Pattern Analysis and Machine Intelligence, vol. 29, Issue: 3, Mar. 2007.

F. Moosmann, B. Triggs, and F. Jurie, Fast discriminative visual codebooks using randomized clustering forests, Advances in neural information processing systems, vol. 19, 2007.

L. Yang, R. Jin, Sukthankar, R. and F. Jurie, Unifying discriminative visual codebook generation with classifier training for object category recognition, IEEE Conference on CVPR, 2008.

Yoav Freund and Robert E. Schapire., A decision-theoretic generalization of on-line learning and an application to boosting, Journal of Computer and System Sciences, vol. 55(1), pp. 119-139, 1997.

J. Friedman, T. Hastie, and R. Tibshirani, Additive logistic regression: a statistical view of boosting, Annals of Statistics, 2000.

W. Zhang, A. Surve, X. Fern, and T. Dietterich, Learning non-redundant codebooks for classifying complex objects, ACM International Conference on Machine Learning, 2009.

L. Torresani, M. Szummer, and A. Fitzgibbon, Efficient object category recognition using classemes, European Conference on Computer Vision, 2010.

J. Mairal, F. Bach, J. Ponce, G. Sapiro, and A. Zisserman, Supervised dictionary learning, NIPS, 2008.

* cited by examiner

1110

| | $\Psi_1$ | $\Psi_2$ | $\Psi_3$ | $\Psi_4$ | $\Psi_5$ | $\Psi_6$ | ... | $\Psi_B$ | |
|---|---|---|---|---|---|---|---|---|---|
| Image 1 | 321 | 5 | 0 | 24 | 103 | 9 | ... | 4 | |
| Image 2 | 0 | 0 | 247 | 19 | 65 | 119 | ... | 0 | + (1115) |
| Image 3 | 141 | 7 | 5 | 24 | 87 | 612 | ... | 34 | |
| Image 4 | 101 | 2 | 35 | 26 | 60 | 62 | ... | 21 | |
| Image 5 | 14 | 20 | 62 | 81 | 73 | 64 | ... | 54 | |
| Image 6 | 8 | 0 | 49 | 41 | 9 | 651 | ... | 432 | |
| Image 7 | 246 | 178 | 82 | 356 | 714 | 16 | ... | 0 | |
| Image 8 | 321 | 224 | 16 | 20 | 321 | 24 | ... | 786 | − (1117) |
| Image 9 | 111 | 144 | 225 | 87 | 21 | 0 | ... | 0 | |
| ... | ... | ... | ... | ... | ... | ... | ... | ... | |
| Image N | 42 | 0 | 7 | 532 | 842 | 741 | ... | 369 | |

- 1111: Label A (Images 1–4)
- 1113: Label W (Images 5–6), Label X (Images 7–9)

1120

| | $\Psi_1$ | $\Psi_2$ | $\Psi_3$ | $\Psi_4$ | $\Psi_5$ | $\Psi_6$ | ... | $\Psi_B$ | |
|---|---|---|---|---|---|---|---|---|---|
| Image 1 | 321 | 5 | 0 | 24 | 103 | 9 | ... | 4 | + (1125) |
| Image 2 | 0 | 0 | 247 | 19 | 65 | 119 | ... | 0 | − |
| Image 3 | 141 | 7 | 5 | 24 | 87 | 612 | ... | 34 | + |
| Image 4 | 101 | 2 | 35 | 26 | 60 | 62 | ... | 21 | − (1127) |
| Image 5 | 14 | 20 | 62 | 81 | 73 | 64 | ... | 54 | |
| Image 6 | 8 | 0 | 49 | 41 | 9 | 651 | ... | 432 | + |
| Image 7 | 246 | 178 | 82 | 356 | 714 | 16 | ... | 0 | |
| Image 8 | 321 | 224 | 16 | 20 | 321 | 24 | ... | 786 | |
| Image 9 | 111 | 144 | 225 | 87 | 21 | 0 | ... | 0 | − |
| ... | ... | ... | ... | ... | ... | ... | ... | ... | |
| Image N | 42 | 0 | 7 | 532 | 842 | 741 | ... | 369 | |

- 1121: Label B (Image 1), Label B (Image 3), Label B (Images 6–7)

FIG. 11

SYSTEMS AND METHODS FOR CREATING A VISUAL VOCABULARY

BACKGROUND

1. Field

The present disclosure relates to visual analysis of images.

2. Background

In the field of image analysis, images are often analyzed based on visual features. The features include shapes, colors, and textures. The features in the image can be detected and the content of the image can be guessed from the detected features. However, image analysis can be very computationally expensive.

SUMMARY

In one embodiment, a method for building a visual vocabulary comprises building a plurality of visual words in a generative vocabulary via unsupervised learning on set of features of a given type; decomposing one or more visual words to a collection of lower-dimensional buckets; and iteratively selecting a sub-collection of buckets from the collection of lower-dimensional buckets, wherein the selection during any iteration after an initial iteration is based at least in part on feedback from previously selected buckets.

In one embodiment, a system for building a visual vocabulary comprises one or more processors; and one or more computer-readable media coupled to the one or more processors, the one or more computer-readable media storing instructions that, when executed by the one or more processors, cause the system to perform operations comprising building visual words in a first generative vocabulary via unsupervised learning on a set of features of a first type of feature; building visual words in a second generative vocabulary via unsupervised learning on a set of features of a second type of feature; decomposing one or more visual words in the first generative vocabulary to a first collection of lower-dimensional buckets; decomposing one or more visual words in the second generative vocabulary to a second collection of lower-dimensional buckets; combining the first and second collections of lower-dimensional buckets from the first and second generative vocabularies respectively to generate a collection of buckets; and selecting a sub-collection of buckets from the collection of buckets based on semantic labels associated with training images and based on which buckets in the collection of buckets are most discriminative of the semantic labels.

In one embodiment, one or more computer-readable media store instructions that, when executed by one or more computing devices, cause the computing devices to perform operations comprising clustering features from one or more images in a multi-dimensional space to form first feature clusters, wherein the features and the first feature clusters are defined in a higher-dimensional space; projecting the features into a lower-dimensional space to form lower-dimensional features, and generating buckets based on the lower-dimensional features.

BRIEF DESCRIPTION OF THE DRAWINGS

FIG. 11 includes tables that illustrate example embodiments of one-against-all partitions.

DESCRIPTION

The following disclosure describes certain explanatory embodiments. Additionally, the explanatory embodiments may include several novel features, and a particular feature may not be essential to practice the systems and methods described herein.

Figure 1:
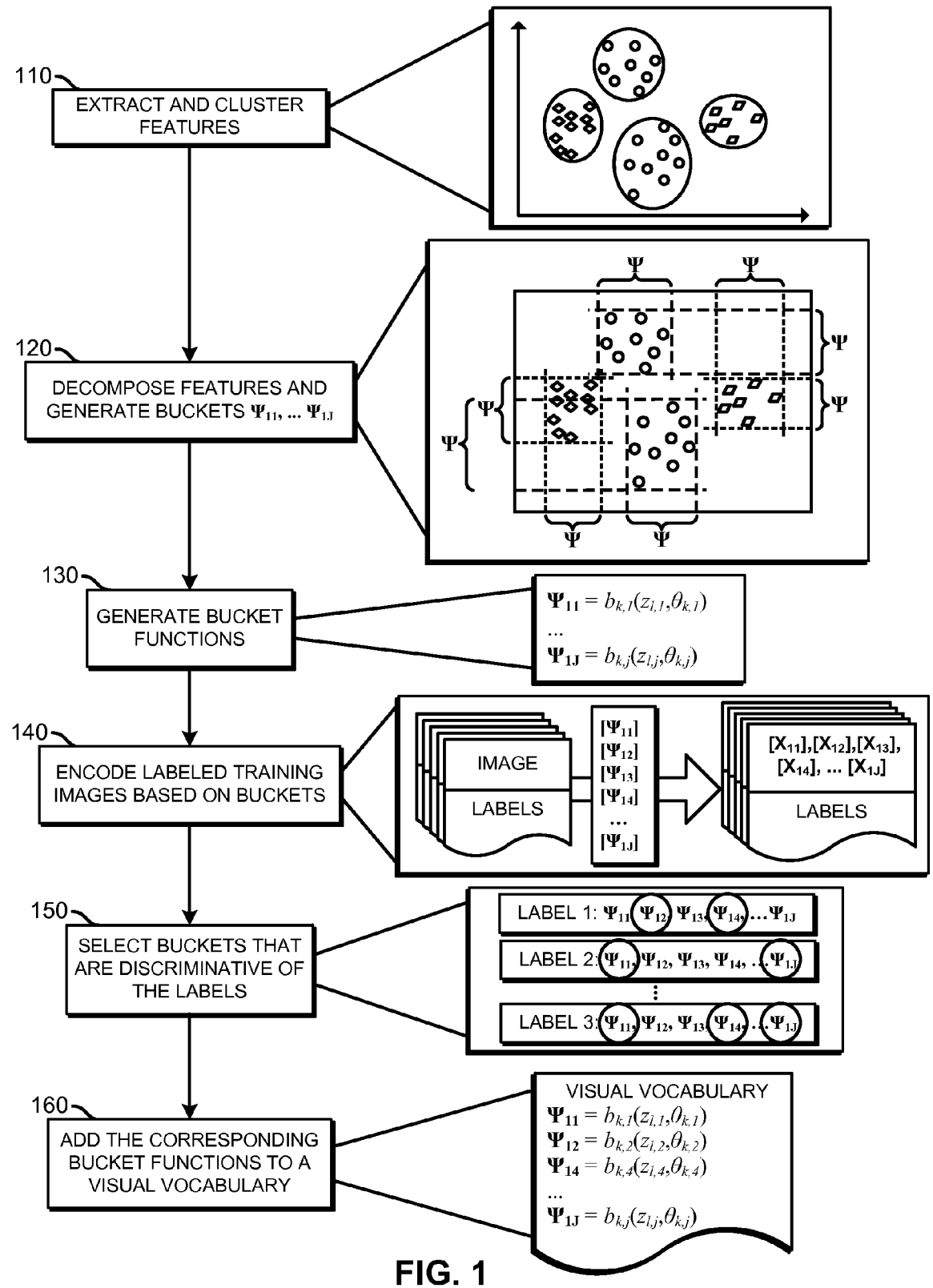
FIG. 1 illustrates an example embodiment of a method for generating a visual vocabulary.

FIG. 1 illustrates an example embodiment of a method for generating a visual vocabulary. First, in block 110, the features in a set of features (e.g., a training set (not shown in FIG. 1)) are clustered in the original dimensional space of the features. The clusters in the original dimensional space are then decomposed into lower-dimensional buckets in block 120. A visual word in the original dimensional space may include the area that is defined by one or more clusters (e.g., the space of a cluster in the original dimensional space may define a visual word in a first vocabulary), and a generative visual vocabulary includes a plurality of the visual words in the original dimensional space. Also, a visual word in the original dimensional space may be decomposed into a set of buckets, and a bucket may define a visual word in the lower-dimensional space (e.g., a word in a second vocabulary). Next, in block 130, respective bucket functions (e.g., functions that map features to buckets) are defined for the buckets, and then the buckets may be ranked, for example based on their purity and/or their ability to discriminate between clusters and/or features.

Then in block 140, training images, which include respective labels (e.g., semantic labels), are encoded based on the buckets. Thus, the features in the training images are described by the buckets. Next, in block 150, buckets that are discriminative of the labels are selected. For example, the buckets that are most discriminative of a label are selected. Finally, in block 160, the bucket functions that correspond to the selected buckets are added to a visual vocabulary. Thus, in the embodiment shown in FIG. 1, the selected buckets are $\Psi_{11}$, $\Psi_{12}$, $\Psi_{14}$, and $\Psi_{1J}$ though other buckets denoted by the ellipses may also be selected (note that herein a bucket may be represented by the symbol "$\Psi$"). Bucket $\Psi_{13}$ is not selected since bucket $\Psi_{13}$ is determined to be less discriminative of features. Accordingly, the respective bucket functions that correspond to buckets $\Psi_{11}$, $\Psi_{12}$, $\Psi_{14}$ and $\Psi_{1J}$ are added to the visual vocabulary.

Therefore, the method may generate a discriminative visual vocabulary from a generative visual vocabulary and may select the scalar features that are most discriminative of one or more labels to define visual words. Since each bucket may be associated with a scalar feature, the process of encoding an image could be performed very fast in a one-dimensional space. Also, the method may learn a discriminative vocabulary for multiple types of features and may combine the advantages of generative and discriminative models, as well as fast scalar visual words.

The operations performed in blocks 110-160 will be described in more details below. Also, let $X=\{X_1, X_2, \ldots, X_N\}$ denote a set of N training images. Each image is represented by a bag of features $$X_i = \{x_{i1}^s, x_{i2}^s, \ldots, x_{iJ_i^s}^s\}_{s=1}^S,$$

where $J_i^s$ denotes the number of the features of type s extracted from the image $X_i$, S is the total number of feature types, and each $x_{ij}^s$ is a $d^s$ dimensional feature vector. Let $y_i \in Y$ denote the label of the image $X_i$, where $Y=\{1, \ldots, C\}$ denotes the label set. The method may generate a visual vocabulary based on the training set so that an image can be represented by a fixed-length vector that is created by encoding the features in the image according to the visual vocabulary.

For sake of simplicity in some of the description, only one feature type (e.g., color, texture, brightness, shape, SIFT feature, CHoG feature) is used, which eliminates the subscript for feature type (i.e., "s"). Also, Z represents the set of labeled feature examples and can be generated by labeling each feature in the image with the corresponding label. The feature examples are indexed with l, which indexes over all images and image features so that $z_l = x_{ij}^s$ and $y_l = y_i$, where y is an image label. Thus, the example set of labeled features is given by $Z=\{z_l, y_l\}_{l=1}^L$. This set is used in the systems and methods discussed herein. In some embodiments, certain features in $X_i$ may be individually labeled, instead of assigning one or more labels for the entire image to all the features in the image. In these embodiments, $y_l = y_{ij}$, where $y_{ij}$ is the label for the j-th feature of image i.

Figure 2:
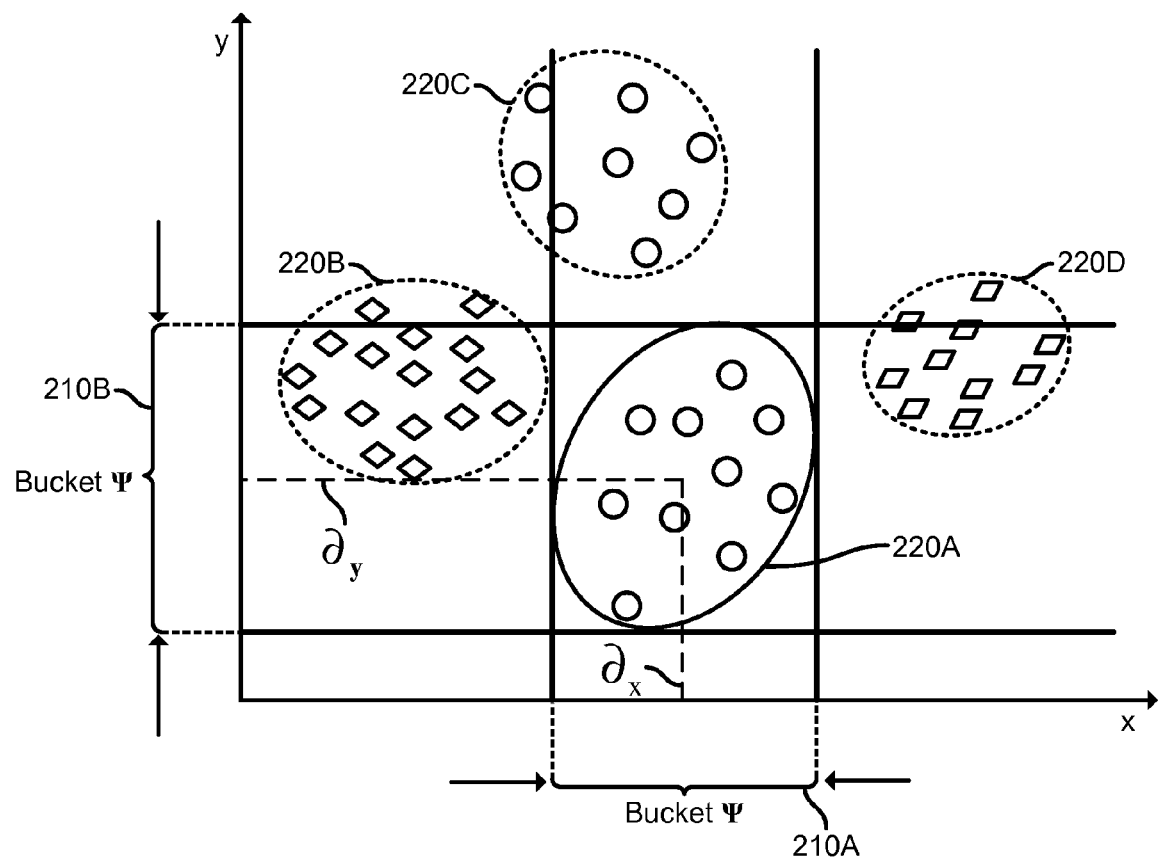
FIG. 2 illustrates an example embodiment of feature clusters and lower-dimensional buckets.

FIG. 2 illustrates an example embodiment of feature clusters 220A-D and lower-dimensional buckets 210A-B. In this example, the feature clusters 220A-D are shown in two-dimensional space, though in other embodiments the features and feature clusters 220A-D may include more or fewer dimensions. Also, though the buckets 210A-B are defined in one-dimension (i.e., in the x or y dimension), in other embodiments the buckets may be defined in two or more dimensions. To form the buckets, the feature clusters 220A-D are decomposed into lower-dimensional space. FIG. 2 shows a two-dimensional first cluster 220A that is decomposed to form two one-dimensional buckets: a first bucket 210A (defined in the x dimension) and a second bucket 210B (defined in the y dimension). The first bucket 210A and the second bucket 210B do not have any common dimension(s), though in other embodiments the buckets may have common dimensions.

For example, to generate buckets given a set of low-level features (of the same type) $z_l^s$, the features are clustered (e.g., via K-means clustering) in the $d^s$-dimensional feature space. This generates $K^s$ clusters $\{\Omega_k^s\}_{k=1}^{K^s}$, which have respective cluster centers $\partial_k^s$. Each cluster ("$\Omega$") is decomposed into $J^s(\leq d^s)$ one-dimensional buckets, where each bucket is defined by a respective bucket function, $$b_{k,j}^s(z_{l,j}^s, \theta_{k,j}^s) = \begin{cases} 1, & \text{if } |z_{l,j}^s - \partial_{k,j}^s| < \theta_{k,j}^s \\ 0, & \text{otherwise,} \end{cases} \quad (b1)$$

for $j \in \{1, \ldots, d^s\}$. FIG. 2 shows an example that decomposes a two-dimensional first cluster 220A into two one-dimensional buckets 210A-B, which are obtained by projecting the original samples (the two-dimensional features and the first cluster 220A) onto the x and y axes, respectively. The width of each bucket $\theta_{k,j}^s$ may be optimized by minimizing a purity measure $\tau_{k,j}^s$ of the correspondence between the cluster assignment of the training features and the bucket assignments of the training features.

In some embodiments the purity measure is generated according to the following: Let $|\Omega_k^s|$ be the number of samples in the cluster $\Omega_k^s$. The total number of samples falling in a bucket is given by $$N_b = \sum_{l=1}^{L^s} b_{k,j}^s(z_l^s, \theta_{k,j}^s).$$

The number of samples falling in both the cluster $\Omega_k^s$ and the bucket is given by $$N_{\Omega,b} = \sum_{z_l^s \in \Omega_k^s} b_{k,j}^s(z_l^s, \theta_{k,j}^s).$$

The purity measure is generated according to $$\tau_{k,j}^s = \eta \frac{N_{\Omega,b}}{|\Omega_k^s|} + (1-\eta) \frac{N_{\Omega,b}}{N_b}, \quad (b2)$$

where $\eta \in [0,1]$ is a regularization parameter. Also, $\tau_{k,j}^s$ is a function of the bucket width $\theta_{k,j}^s$ and the bucket center $\partial_{k,j}^s$. Thus, the optimal bucket width may be found by maximizing $\tau_{k,j}^s$ with respect to $\theta_{k,j}^s$ and $\partial_{k,j}^s$.

Figure 3:
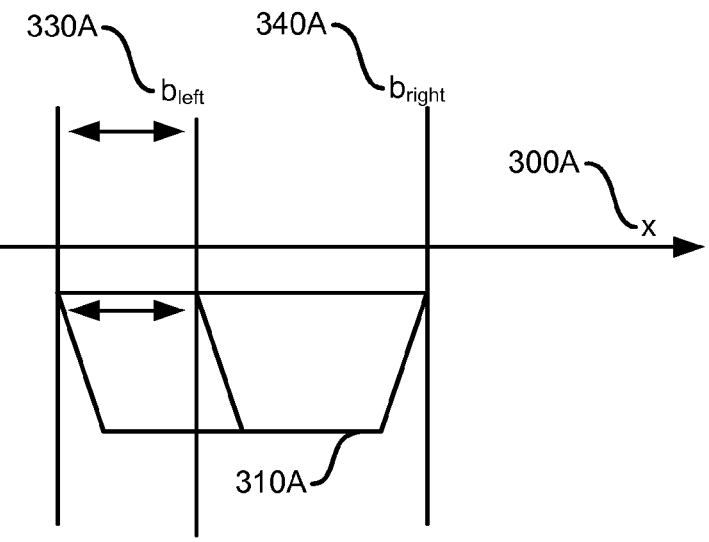
FIG. 3 illustrates an example embodiment of a method for adjusting the boundaries of a bucket.
Figure 3:
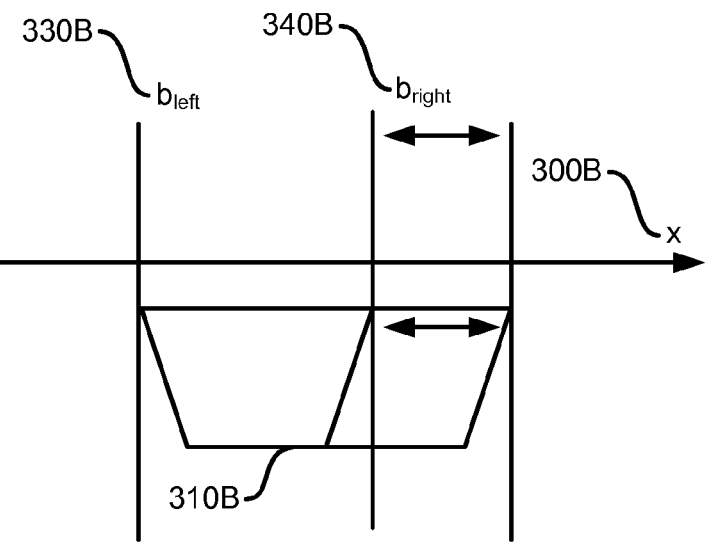

In some embodiments the bucket width is generated by an iterative method. FIG. 3 illustrates an example embodiment of a method for adjusting the boundaries of a bucket. The method begins in block 391 by choosing the right partition boundary $b_{right}$ 340A of a bucket 310A in the x dimension 300A. The right partition boundary $b_{right}$ 340A may be chosen as a fixed percentage of the total number of samples (features) in the set of samples or it may be chosen at random. Next, the left partition boundary $b_{left}$ 330A is selected. This can be selected by evaluating a clustering quality measure, and the method may select the left partition boundary $b_{left}$ 330A that maximizes the clustering quality of the bucket (which may also be referred to herein as the "bucket purity"). Some consideration for the size of the bucket partition may be made so that the partition is sufficiently large, and in some embodiments the bucket purity measure inherently considers the partition size. Once the initial best left partition boundary $b_{left}$ 330A is selected in block 391, in block 392 the left partition boundary 330B is fixed and the right partition boundary $b_{right}$ 340B is varied in the x dimension 300B such that the optimal bucket 310B is found using the bucket purity measure. Once the initial best right partition boundary $b_{right}$ 340B is found, the method may repeat blocks 391 and 392 for a specified number of iterations or until the boundaries no longer change. The left partition boundary $b_{left}$ and right partition boundary $b_{right}$ can then be converted to the bucket width $\theta_{k,j}^s$ and the bucket center $\partial_{k,j}^s$.

In some embodiments the bucket center $\partial_{k,j}^s$ is given as the projection of the cluster center, and the appropriate bucket width $\theta_{k,j}^s$ for a bucket centered at $\partial_{k,j}^s$ is determined. In these embodiments, the method above may be simplified when the bucket width is selected such that the bucket purity is maximized. In these embodiments no iterative determination of the left partition boundary $b_{left}$ and then the right partition boundary $b_{right}$ is necessary, as the left and right partition boundaries are selected by varying the bucket width $\theta_{k,j}^s$ (which may be determined by iterative methods).

Also, bucket purity measures may be formed from contingency-table-based measures. The table below shows an example contingency table that includes three clusters $\Omega$ and three buckets $\Psi$. The number of samples (features) in cluster i is given by $a_i$, the number of samples in bucket partition j is given by $b_j$, the number of samples shared by cluster i and bucket partition j is given by $n_{ij}$, and the total number of samples is given by N.

|   | $\Psi$ |   |   |   |
|---|---|---|---|---|
| $\Omega$ | $n_{11}$ | $n_{12}$ | $n_{13}$ | $a_1$ |
|   | $n_{21}$ | $n_{22}$ | $n_{23}$ | $a_2$ |
|   | $n_{31}$ | $n_{32}$ | $n_{33}$ | $a_3$ |
|   | $b_1$ | $b_2$ | $b_3$ | N |

Some embodiments have only two partitions for each bucket: (1) inside the bucket, and (2) not inside the bucket. Thus, in FIG. 2, the features in the first cluster 220A would be "inside" the first bucket 210A, and the features in the second cluster 220B would be "not inside" (or "outside") the first bucket 210A. However, in some embodiments there could be other partitioning schemes involving more than two partitions. Also, in some embodiments only two clusters are used to evaluate the purity of a bucket. For example, one cluster could represent a cluster of interest while the second cluster could represent all other clusters. However, in some embodiments more than two clusters are used to evaluate the purity of a bucket.

Some embodiments of the measure of bucket purity include clustering quality measures such as the Rand Index, Mutual Information, and variants of these measures that account for results obtained by random, such as the Adjusted Rand Index and Adjusted Mutual Information. These measures can take on various forms, as described in WO/2012/054399, by Bradley Denney and Anoop Korattikara-Balan, and in WO/2012/054352, by Bradley Denney and Anoop Korattikara-Balan, which are incorporated by reference.

After the boundaries of the buckets are determined, $\theta_{k,j}^s$ and $\partial_{k,j}^s$ will have been determined, and the respective bucket functions, which map features to the respective buckets, can be defined:

$$b_{k,j}^s(z_{i,j}^s, \theta_{k,j}^s) = \begin{cases} 1, & \text{if } |z_{i,j}^s - \partial_{k,j}^s| < \theta_{k,j}^s \\ 0, & \text{otherwise.} \end{cases}$$

In some embodiments, the buckets are ranked in a decreasing order according to their corresponding purity $\tau_{k,j}^s(\theta_{k,j}^s)$ values, and the top $J^s(\leq d^s)$ buckets may be selected (e.g., embodiments where the total number of buckets is too great, to save computing resources, to reduce computational complexity, etc.). In some embodiments all of the buckets are used. Thus for the feature type s, $K^s \times J^s$ buckets (e.g., total number of clusters×total number of selected dimensions) can be generated. The total number of buckets for all S feature types is $B = \Sigma_{s=1}^S K^s \times J^s$. The buckets are used to define words in an intermediate visual vocabulary $V_I$.

Figure 4:
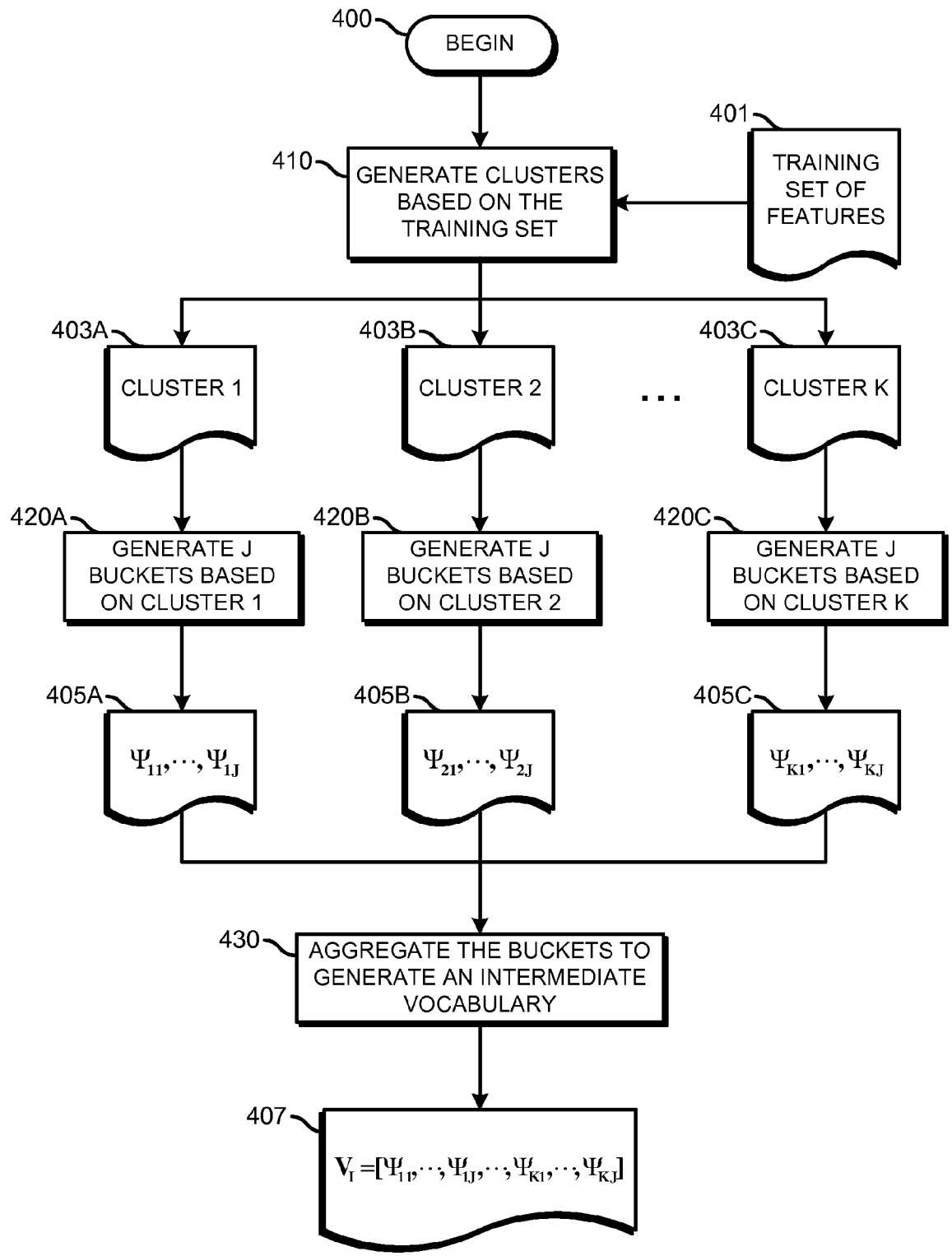
FIG. 4 illustrates an example embodiment of a method for generating a visual vocabulary.

FIG. 4 illustrates an example embodiment of a method for generating a visual vocabulary (e.g., an intermediate visual vocabulary). For purposes of explanation, the embodiment shown in FIG. 4 describes only a single feature type, though other embodiments may include more feature types. To use multiple feature types, the embodiment shown in FIG. 4 may be repeated for the different feature types, and then the results can be combined to form a vocabulary. Also, other embodiments of this method and the other methods described herein may omit blocks, add blocks, change the order of the blocks, combine blocks, and/or divide blocks into multiple blocks. Additionally, the methods described herein may be implemented by the systems and devices described herein.

The flow in FIG. 4 begins in block 400. Next, in block 410, cluster 1 403A, cluster 2 403B, . . . , and cluster K 403C are generated based on a training set of features 401 (samples), which may be labeled or unlabeled. The training set of features may be retrieved from a computer-readable medium and clustered by a computing device that implements one or more clustering methods. Thus, K clusters are generated in block 410, and the clusters are generated based at least on the visual similarity of the features (and in some embodiments the clusters are based on only the visual similarity of the features). Next, in blocks 420A-C, for each of the K clusters 403A-C, J corresponding buckets 405A-C are generated based on the respective cluster (e.g., J may be equal to the number of the dimensions of the features). Also, blocks 420A-C may be performed serially or in parallel. The flow proceeds to block 430, where the buckets are aggregated to generate an intermediate vocabulary $V_I$ 407, which includes all the buckets 405A-C. The intermediate vocabulary $V_I$ 407 may be used to encode an image (e.g., describe one or more feature in an image with the words in the vocabulary).

Figure 5:
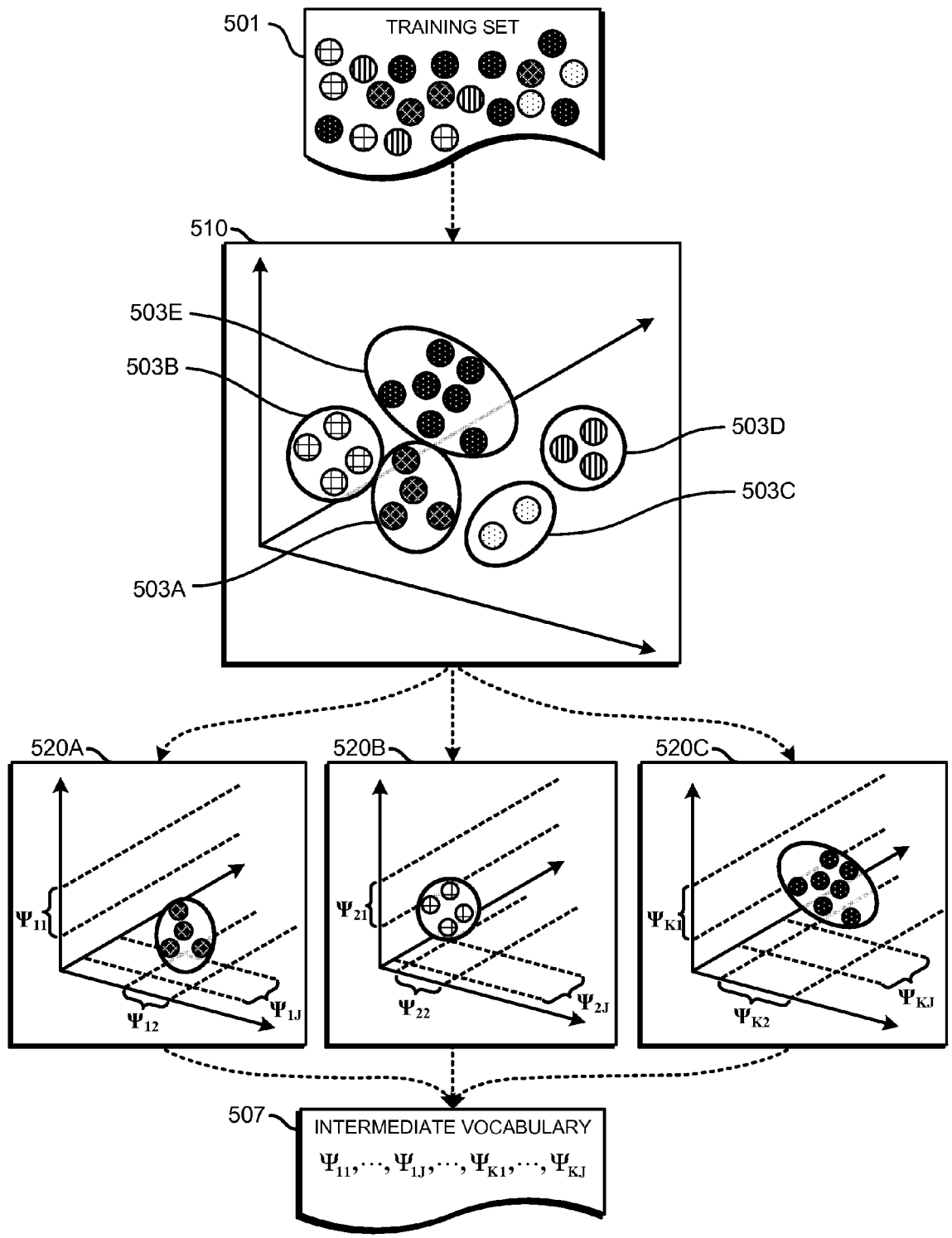
FIG. 5 illustrates an example embodiment of a method for generating a visual vocabulary.

FIG. 5 illustrates an example embodiment of a method for generating a visual vocabulary (e.g., an intermediate visual vocabulary). In block 510, the features in a training set 501 are clustered in their native dimensional space to form five clusters 503A-E. Though FIG. 5 shows three dimensions, other embodiments may operate in a dimensional space that has more or fewer dimensions. Next, in blocks 520A-C, respective corresponding buckets are generated for the clusters 501A-E (though blocks corresponding to clusters 503C-D are not shown). Thus, buckets $\Psi_{11}$, $\Psi_{12}$, and $\Psi_{1J}$ are formed for cluster 503A; buckets $\Psi_{21}$, $\Psi_{22}$, and $\Psi_{2J}$ are formed for cluster 503B; . . . ; and buckets $\Psi_{K1}$, $\Psi_{K2}$ and $\Psi_{KJ}$ are formed for cluster 503E. Generating the buckets includes decomposing the respective cluster into lower dimensions. For example, cluster 503A is decomposed into the three dimensions (e.g., by projecting the cluster 503A into each dimension), and a respective one-dimensional bucket is formed for each dimension. The buckets are then added to an intermediate vocabulary 507. The intermediate vocabulary includes multiple buckets for each dimension. For example, buckets $\Psi_{12}$, $\Psi_{22}$, and $\Psi_{K2}$ are all defined in the same dimension.

Figure 6:
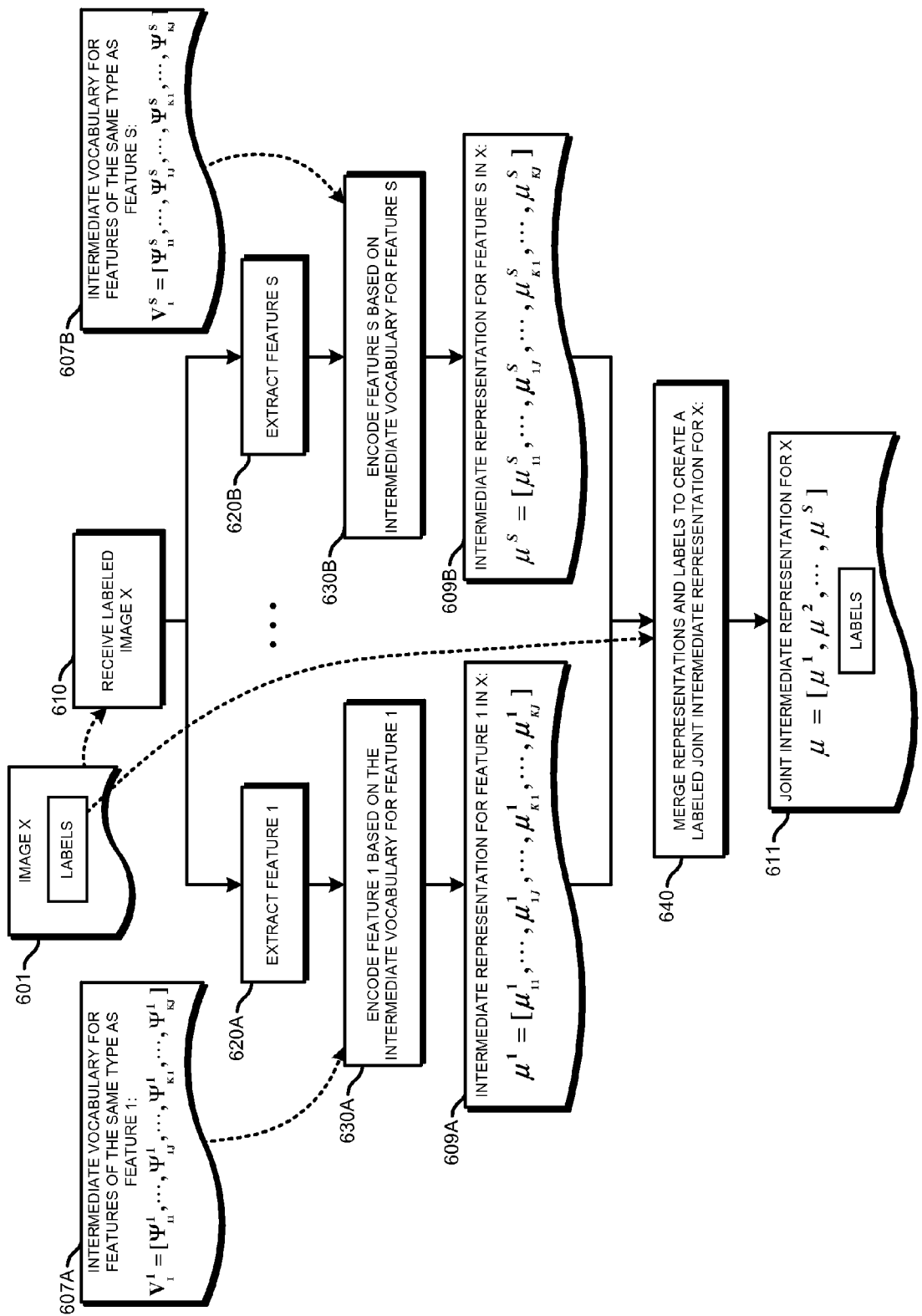
FIG. 6 illustrates an example embodiment of a method for encoding an image with a vocabulary.

FIG. 6 illustrates an example embodiment of a method for encoding an image with a vocabulary. In this example embodiment, a labeled image X, which includes multiple types of features $\{z_1^s, \ldots, z_{M^s}^s\}_{s=1}^S$, is encoded with the intermediate vocabulary $V_I$ to obtain an intermediate representation $\mu$ in the form of a B-dimensional vector, $$\mu = [\mu_{1,1}^1, \ldots, \mu_{k,j}^s, \ldots, \mu_{K^s,J^s}^S], k=1, \ldots, K^s;$$
$$j=1, \ldots, J^s; s=1, \ldots, S, \quad (1c)$$

where $$\mu_{k,j}^s = \frac{1}{M^s} \sum_{z_l^s \in X_l} b_{k,j}^s(z_l^s, \theta_{k,j}^s), \quad (1d)$$

and where S is the number of the types of features, $K^s$ is the number of clusters for a type of feature, $J^s$ is the number of buckets for a type of feature, and $M^s$ is the total number of features of type s extracted from the labeled image X.

The flow starts in block 610, where a labeled image X 601 is received (e.g., retrieved from a computer-readable medium). The image X 601 may be labeled with one or more semantic labels. Next, in blocks 620A-B, the features 1, . . . , S are extracted (and the blocks 620A-B may be performed in parallel, serially, or a combination of in parallel and serially). Flow then proceeds to blocks 630A-B. In this embodiment the features include different types of features, and each type of feature has its own corresponding intermediate vocabulary. In blocks 630A-B, the features (features 1, . . . , S) are encoded based on the respective corresponding intermediate vocabularies 607A-B of their type of feature to generate respective intermediate representations for the features 609A-B. Next, in block 640, the labels and the intermediate representations for the features 609A-B are merged to generate a joint intermediate representation $\mu$ for image X 611 that includes the labels.

Figure 7:
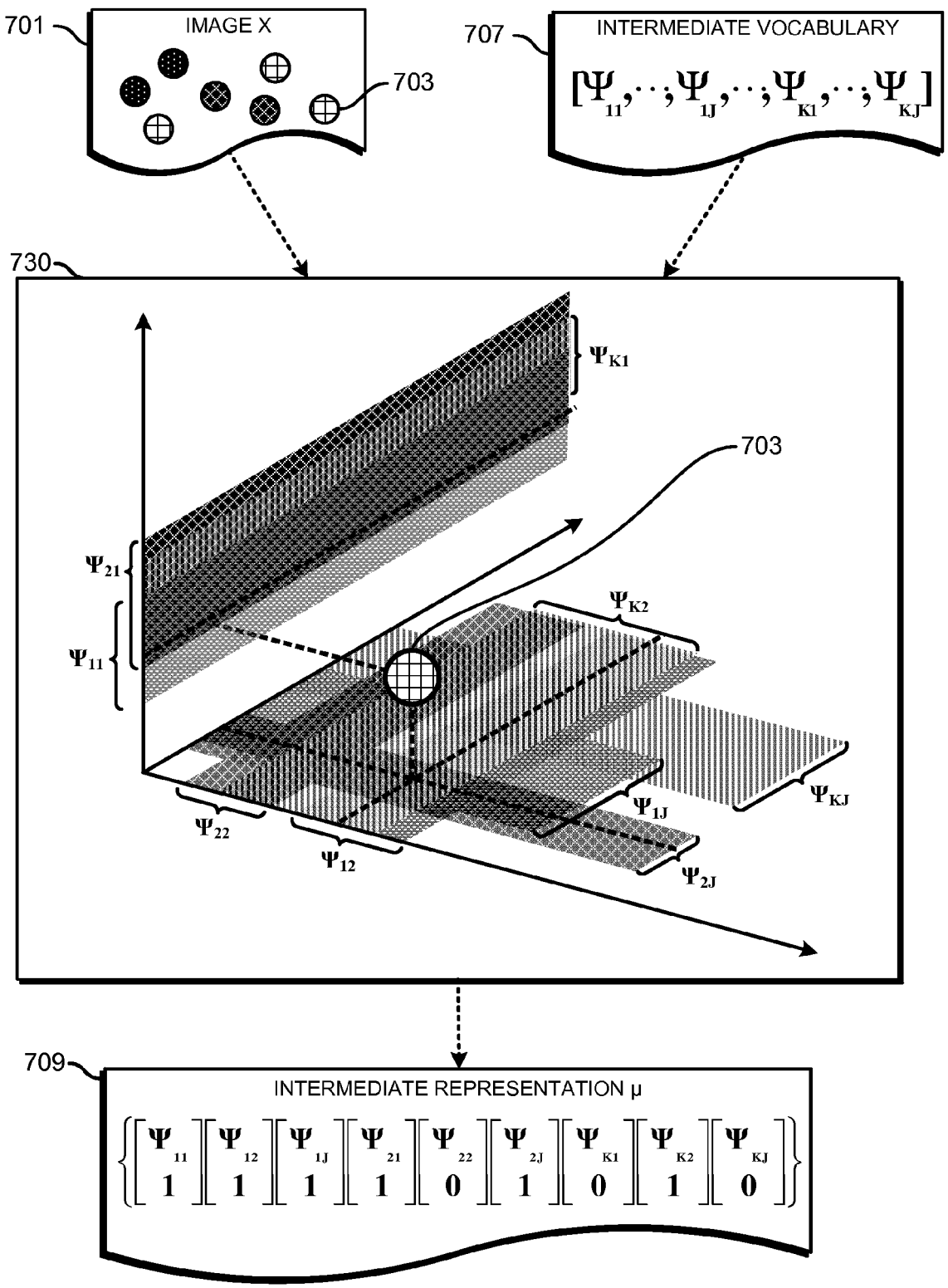
FIG. 7 illustrates an example embodiment of a feature that is encoded according to a vocabulary.

Also, FIG. 7 illustrates an example embodiment of a feature that is encoded according to a vocabulary. An image feature 703 is extracted from an image X 701, which includes several features. In block 730, an intermediate representation $\mu$ 709 is generated based on the feature 703 and the corresponding intermediate vocabulary 707, for example by encoding the feature 703 based on the intermediate vocabulary 707 that corresponds to the same type of feature as the first feature 703. In block 730, the feature 703 is projected into the respective dimensions of the buckets in the intermediate vocabulary 707, and the respective buckets that the projections of the feature 703 map to (e.g., fall into) in each dimension are determined. In the example embodiment shown, the projections of the feature 703 fall into buckets $\Psi_{11}$, $\Psi_{12}$, $\Psi_{1J}$, $\Psi_{21}$, $\Psi_{2J}$, and $\Psi_{K2}$. Also, the projections of the feature 703 do not fall into (or fall outside of) buckets $\Psi_{22}$, $\Psi_{K1}$, and $\Psi_{KJ}$. The mappings to the buckets are then described in an intermediate representation $\mu$ 709 of the feature 703. The intermediate representation $\mu$ 709 represents each bucket mapping with a binary value, where 1 indicates that the feature falls into (maps to the inside of) the respective bucket and 0 indicates that the feature falls outside (maps to the outside of) the respective bucket. The binary value may be represented by a single bit in a computing system, which may allow a computing system to store the intermediate representation $\mu$ 709 using fewer bits than are required to store the feature itself. Also, some embodiments may use values other than 1 and 0 to represent the mappings to the buckets, for example integer values (e.g., 1 to 10, 0 to 100).

Figure 8:
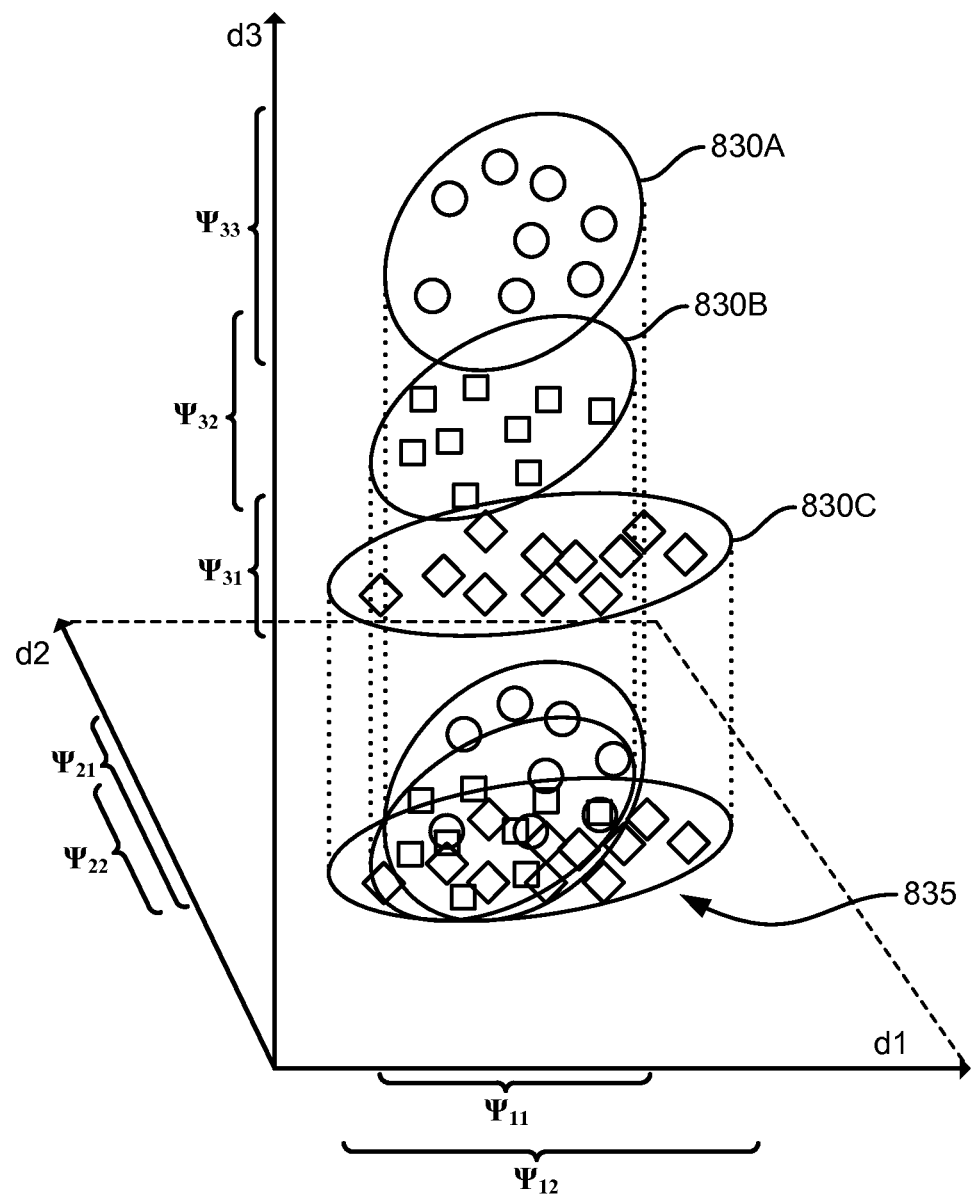
FIG. 8 illustrates an example embodiment of the most discriminative buckets of a set of clusters.

After an intermediate representation $\mu$ has been generated for one or more images (e.g., the images in a training set), the most discriminative buckets can be determined. FIG. 8 illustrates an example embodiment of the most discriminative buckets of a set of clusters. Also, the embodiment shown in FIG. 8 has been simplified for purposes of explanation and includes only a few clusters, three dimensions, and a significant difference between the discriminability of one dimension (d3) and the other two dimensions (d1 and d2). Other embodiments may include more clusters, more dimensions, and more complex relationships of the clusters in different dimensions.

The three clusters 830A-C in the set of clusters are formed in a three-dimensional space that has dimensions d1, d2, and d3. However, two of the dimensions, d1 and d2, are not very discriminative of the clusters 830A-C. This is illustrated by the projections 835 of the clusters 830A-C onto the two-dimensional space defined by d1 and d2. As shown by the projections 835, in the two-dimensional space of d1 and d2 the clusters 830A-C overlap so much that discriminating between the clusters using only dimension d1, dimension d2, or both is very difficult. Thus, buckets $\Psi_{11}$, $\Psi_{12}$, $\Omega_{21}$, and $\Psi_{22}$ do not efficiently discriminate between the clusters 830A-C. However, in dimension d3 the clusters 830A-C do not overlap much. Therefore, dimension d3 may be used to more efficiently discriminate between the clusters 830A-C, and buckets $\Psi_{31}$, $\Psi_{32}$, and $\Psi_{33}$ more efficiently discriminate between the clusters 830A-C than buckets $\Psi_{11}$, $\Psi_{12}$, $\Psi_{21}$, and $\Psi_{22}$.

Figure 9:
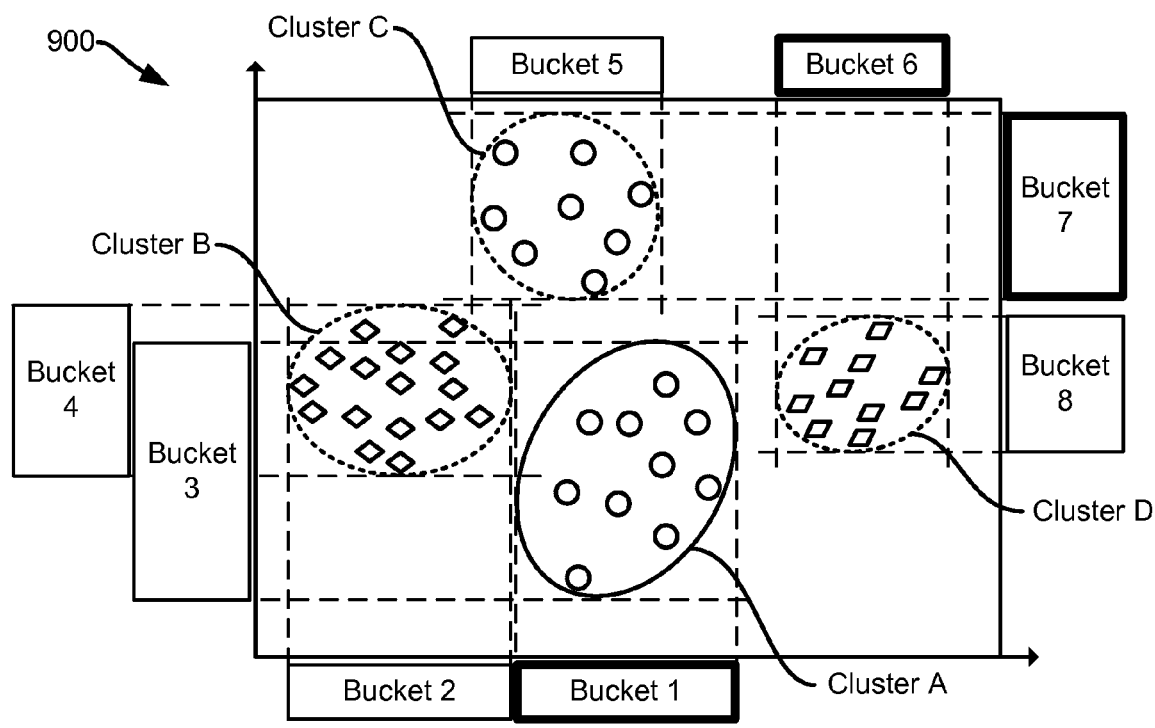
FIG. 9 illustrates an example embodiment of a set of discriminative buckets.

FIG. 9 illustrates an example embodiment of a set of discriminative buckets. FIG. 9 illustrates four clusters of features (cluster A, cluster B, cluster C, and cluster D) that are defined in a two-dimensional space 900. Each cluster is projected onto each of the two dimensions, and eight buckets (buckets 1-8) are generated based on the eight projections. A new feature could be mapped to a cluster by mapping the new feature to each of the eight buckets and then determining, based on the mappings to the eight buckets, which cluster the new feature maps to. However, mapping the new feature to eight buckets would generate bucket information that is not necessary to discriminate whether or not the feature falls in a particular bucket. The presence of unnecessary information in the mapping to the eight buckets is illustrated in table 920, which shows that only three buckets, buckets 1, 6, and 7, are necessary to map a feature to a cluster. Thus, it may be possible to determine a set of discriminative buckets that allow a feature's corresponding cluster to be determined without mapping the feature to all of the buckets. Also, the discriminative buckets allow the mapping of a feature to any of the clusters (e.g., no cluster is excluded from the mapping such that a feature cannot possibly be mapped to the cluster). Furthermore, if each cluster is a word in a visual vocabulary (e.g., a visual vocabulary in an original dimensional space), each word may be defined/represented by a set of buckets and bucket values. Also, in some embodiments, each bucket may itself be considered to be a word in a visual vocabulary (e.g., a visual vocabulary in a lower-dimensional space).

Figure 10:
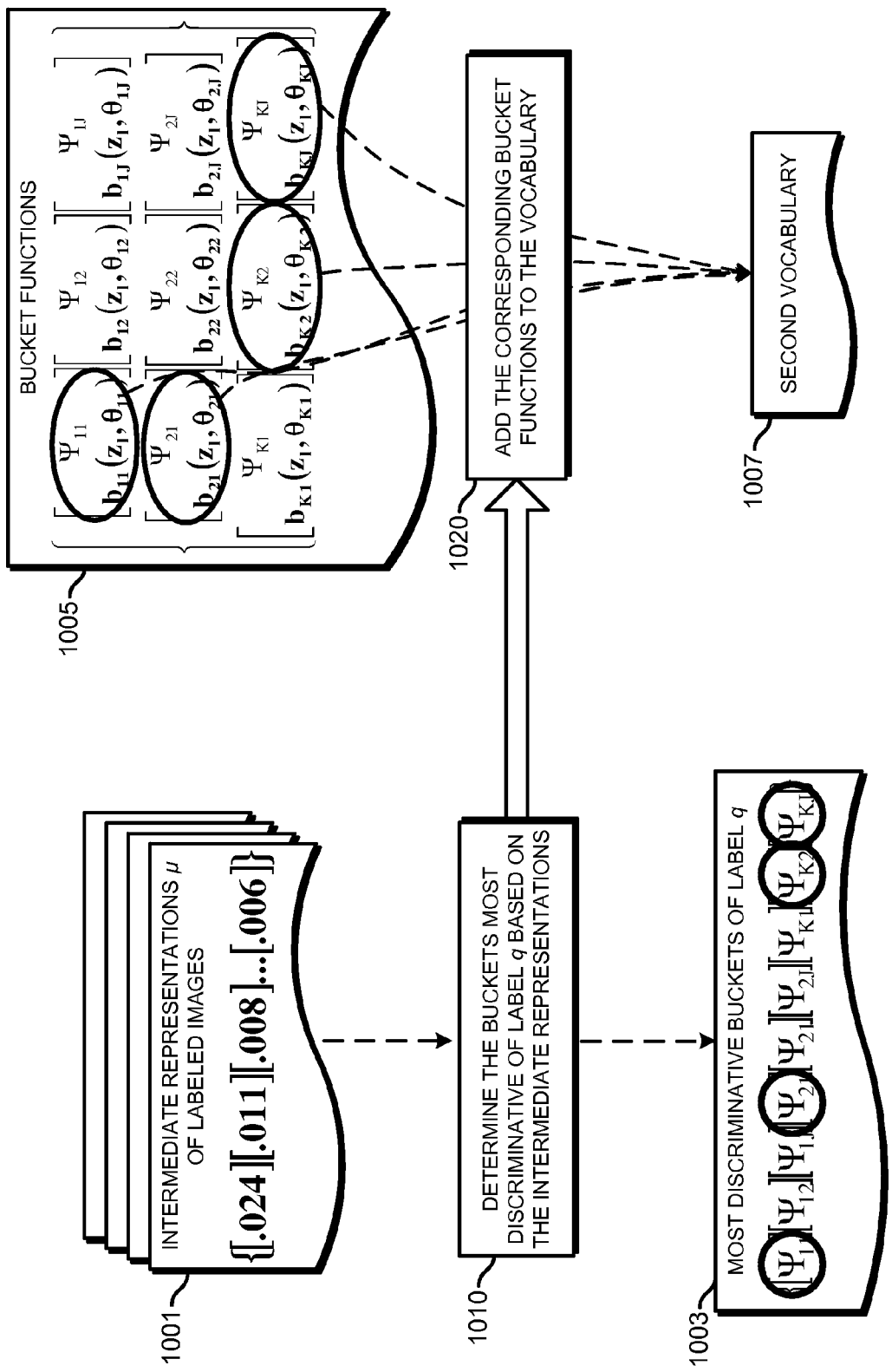
FIG. 10 is a block diagram that illustrates the selection of bucket functions based on bucket values.

FIG. 10 is a block diagram that illustrates the selection of buckets based on bucket values. In block 1010, the respective bucket values (the values contained in respective buckets) of intermediate representations $\mu$ of labeled images 1001 are analyzed to determine which buckets are most discriminative of label q 1003. Next, in block 1020 the bucket functions 1005 of the most discriminative buckets of label q 1003 are added to a second vocabulary $D_I$ 1007. Furthermore, a respective classifier may be trained for each bucket, and the classifiers may be added to a third vocabulary $D_h$. Thus, the bucket functions in the second vocabulary $D_I$ 1007 are selected based on the bucket values in the intermediate representations of labeled images 1001.

In some embodiments, the buckets are selected via Ada-Boost. Additionally, a classifier $h_t(x)$ may be trained to indicate if a label applies to a feature. For example, a bucket value $\mu_{k,j}^s$ may be input to a classifier $h_t(x)$ that outputs a label score (e.g., classification score) that indicates the probability of a label applying to a feature. Also, training a classifier $h_t(x)$ may include determining a respective weight for the classifier. In a set of N training examples $Z=\{x_n,y_n\}_{n=1}^N$, where $x_n$ is a d dimensional vector and $y_n \in \{1, -1\}$, AdaBoost iteratively learns a sequence of weak classifiers $h_t(x)(t=1,\ldots,T)$ from the training examples with respect to a distribution $w_n^{(t)}$ of the examples for each iteration t. A strong classifier is created by a linear combination of the T weak classifiers, $$H(x)=[\Sigma_{t=1}^T h_t(x)]-\theta_b. \tag{1}$$

The classification of a sample x (e.g., a visual feature) is obtained by $$\hat{y}(x)=\text{sign}[H(x)].$$

In order to perform feature selection with AdaBoost, a stump classifier may be used as a weak classifier $h_t(\bullet)$, and an element $\mu_{k,j}^s$ of the intermediate representation $\mu$ may be used as an input to the stump classifier. In some embodiments, each stump classifier is associated with a bucket defined on a single dimension of a feature vector $x_n$. Also, the domain of a bucket may be based on the i-th element (the i-th dimension) of the feature vector $x_n$ (i.e., based on $f_i(x_n)=x_{ni}$). In some embodiments, the bucket's domain is based on a more complicated function $f_i$, which considers multiple dimensions of the feature vector. Thus, the best weak classifier $h_t(\bullet)$ may be determined by finding the best corresponding intermediate representation element, which corresponds to choosing the best corresponding bucket(s) $b_{k,j}^s$ (since the representation is a vector, every element corresponds to a bucket, and finding the best element may be equivalent to finding the best bucket), for example based on the bucket values. Also, a best bucket (e.g., element) in an intermediate image representation may be determined by finding the best weak classifier.

Additionally, when selecting a bucket function and/or training a classifier (e.g., a classifier based on the bucket function), some embodiments attempt to minimize the following weighted least square error, $$E = \sum_{j=1}^N w_j(h_m(f_i(x_j))-y_j)^2, \tag{2}$$

where $$h_t(f_i(x_j)) = \begin{cases} v_i, & \text{if } f_i \geq \theta_i \\ u_i, & \text{otherwise,} \end{cases} \tag{3}$$

$$v_i = \frac{W_+^r - W_-^r}{W_+^r + W_-^r}, v_i \in [-1, 1], \tag{4}$$

$$u_i = \frac{W_+^l - W_-^l}{W_+^l + W_-^l}, u_i \in [-1, 1], \tag{5}$$

$$W_+^r = \sum_{j:(y_j=1)\&(f_i(x_j)\geq\theta_i)} w_j, \tag{6}$$

$$W_-^r = \sum_{j:(y_j=-1)\&(f_i(x_j)\geq\theta_i)} w_j, \tag{7}$$

$$W_+^l = \sum_{j:(y_j=1)\&(f_i(x_j)<\theta_i)} w_j, \tag{8}$$

and $$W_-^l = \sum_{j:(y_j=-1)\&(f_i(x_j)<\theta_i)} w_j. \tag{9}$$

In each iteration, the optimal parameters of $h_t(x)$ and $\theta_i$, together with the best scalar feature $f_*$, can be determined by minimizing the error of equation (2):

$$f_* = \underset{f_i \in F}{\text{argmin}}\, E(f_i), \tag{10}$$

where $F=\{f_i\}_{i=1}^d$ is the feature set. Next, the weight distribution is updated for the following iteration by $$w_j \leftarrow w_j \cdot \exp(-y_j \cdot f_*(x_j)) \tag{11}$$

Let $\omega = \Sigma_j^N w_j$, and $w_j$ is further normalized to be a distribution by $$w_j \leftarrow \frac{1}{\omega} w_j. \tag{12}$$

In some embodiments each label is associated with one or more stump classifiers, which each may be evaluated in a one-dimensional space. This may significantly reduce the computational complexity of the evaluation. For example, from a training set $(Z=\{z_l, y_l\}_{l=1}^L)$ of labeled images, C (one for each label) binary one-against-all partitions $\{G_k\}_{k=1}^C$ are generated, where each one is for a binary classification task (e.g., a binary classification operation that defines which are positive samples and negative samples for training a binary classifier) for a label. In the k-th task $G_k$, only the k-th label is considered to be positive (e.g., assigned a positive weight), and other labels are considered to be negative (e.g., assigned a negative weight). Each sample (image feature) is associated with a weight $w_{kl}$ in each task, $k=1,\ldots,C$ and $l=1,\ldots,L$. Let $N_k^+$ and $N_k^-$ be the number of positive and negative samples in the k-th task, respectively. Their corresponding weights $W_k=\{w_{kl}\}_{l=1}^L$ are initialized to $1/N_k^+$ and $1/N_k^-$, respectively. In each task $G_k$ these embodiments attempt to train a label classifier $H_k$.

FIG. 11 includes tables that illustrate example embodiments of one-against-all partitions. The first table 1110 and the second table 1120 show images 1 through N (samples) and their respective bucket values that were generated based on the intermediate vocabulary (note that the bucket values of the embodiments shown in FIG. 11 are not normalized). For example, for image 3, the bucket values that were generated when image 3 was encoded with the intermediate vocabulary are [141, 7, 5, 24, 87, 612, . . . 34]. Also, each of the images listed in the first table 1110 and the second table 1120 have been assigned one or more labels. For example, in the first table 1110, images 1-4 have been assigned label A 1111, and the other images in the first table 1110 have been assigned other labels 1113. Also, assuming that the first table 1110 and the second table 1120 both relate to the same images, then at least some of the images have been assigned multiple labels. For example, image 6 would have been assigned both label W and label B.

In the first table 1110, in a one-against-all partition, only the label A 1111 is considered positive 1115, and the other labels 1113 are considered negative 1117. In the second table 1120, in a one-against-all partition, only the label B 1121 is considered positive 1125, and the other labels (not shown) are considered negative 1127. In some embodiments, an image may be associated with more than one label and thus may be included in more than one positive partition. For example, image 1 is associated with both label A 1111 and label B 1121. Therefore, image 1 is considered positive in both of the one-against-all partitions illustrated by the first table 1110 and the second table 1120. In some embodiments, each image (sample) is associated with only one label and, accordingly, is included in only one positive partition. The one-against-all partitions may be used to train classifiers for each label.

In some embodiments to select buckets and to train classifiers the systems and methods perform the following:
1. Do for t=1, ..., T: (for each of the T weak-classifiers, where T is the selected number of classifiers):
　1.1 Do for k=1, ..., C: (for each label):
　　(i) Train a weak classifier $h_{k,t}$ for the task $G_k$ by minimizing equation (2) with the weight distribution $W_k$ associated with the task.
　　(ii) Add $h_{k,t}$ to the k-th label classifier $H_k = \{h_{k,1}, \ldots, h_{k,t-1}\}$.
　　(iii) Apply $h_{k,t}$ to equations (11)-(12) to update the weight distribution $W_k$.
2. Concatenate all the generated weak classifiers to generate a visual vocabulary $D_h = \{h_{k,t}\}$ for k=1, ..., C and for t=1, ..., T.
3. Output a first visual vocabulary $D_h$ that includes T×C classifiers $\{h_{k,t}\}$. Also, a corresponding second visual vocabulary $D_I$ may include up to T×C bucket functions (which can be arranged into a $|D_I| \times 1$ dimensional array that may have fewer than T×C bucket functions if duplicates are removed) that correspond to the buckets selected as inputs for the classifiers. For example, if the total number of labels C is 2; if buckets 1, 3, 8, 22, 54, and 101 are the most discriminative of label 1; and if buckets 2, 5, 8, 67, 101, and 192 are the most discriminative of label 2, then the respective classifiers that correspond to buckets 1, 2, 3, 5, 8, 22, 54, 67, 101, and 192 are added to the first visual vocabulary $D_h$, and the bucket functions that correspond to buckets 1, 2, 3, 5, 8, 22, 54, 67, 101, and 192 are added to the second visual vocabulary $D_I$. Note that some embodiments may remove duplicate buckets and/or remove duplicate classifiers.

Then given a set of features $\{z_m\}_{m=1}^M$ extracted from an image $X_I$, the features can be encoded with the first vocabulary $D_I$ into a T×C dimensional vector with elements obtained by $$f_{k,t} = \frac{1}{M} \sum_{m=1}^{M} h_{k,t}(z_m),$$

where k=1, ..., C, t=1, ..., T, and M is the total number of features, which may then be used to determine the labels that apply to the image. Also, the features can be encoded with the second vocabulary $D_I$ into a $|D_I| \times 1$ dimensional array with elements obtained by $$\mu_k = \frac{1}{M} \sum_{m=1}^{M} b_k(z_m, \theta_k),$$

where k=1, ..., $|D_I|$.

The embodiments described above may be extended to handle multiple types of features. For the sake of simplicity, let $z_l^s = x_{ij}^s$ and $y_l^s = y_i$. A composite training set $\{Z^s\}_{s=1}^S$, where $Z^s = \{z_l^s, y_l^s\}$ represents a single type of feature, can be generated. C binary one-against-all partitions $\{G_k\}_{k=1}^C$ are generated, with $G_k = \{G_k^s\}_{s=1}^S$ taking the multiple types of features into account. Each subset $G_k^s$ is associated with an independent weight distribution $W_k^s = \{w_{kl}^s\}_{l=1}^{L^s}$, in which positive samples and negative samples are respectively initialized to $1/N_k^{s,+}$ and $1/N_k^{s,-}$. A label classifier $H_k$ is trained for each task $G_k$.

In some embodiments the systems and methods perform the following:
1. Do for t=1, ..., T: (for each of the T weak-classifiers, where T is the selected number of classifiers):
　1.1 Do for k=1, ..., C: (for each label):
　i) Do for s=1, ..., S (for each feature type):
　　a. Train a weak classifier $h_{k,t}^s$ for the task $G_k^s$, by minimizing equation (2) with the weight distribution $W_k^s$ associated with the task. Let $E^s$ be the error produced by $h_{k,t}^s$.
　ii) Find $s^* = \mathrm{argmin}_s E^s$.
　iii) Apply $h_{k,t}^{s^*}$ to equations (11)-(12) to update the corresponding weight distribution $W_k^{s^*}$.
　iv) Generate an image-level weight distribution from $W_k^{s^*}$, $$\pi_i = \sum_{z_{kl}^{s^*} \in X_i} w_{kl}^{s^*},$$

$$i = 1, \ldots, N,$$

where $\pi_i$ is the weight for the image $X_i$, evaluated based on a current optimal feature type $s^*$.
　v) Update the weight distributions for other feature types $s \neq s^*$ by propagating $\pi_i$:
　　a. Do for i=1, ..., N:
　　　1) Do, for s=1, ..., S and where $s \neq s^*$:
　　　　A) compute $$\omega_S = \sum_{z_{kl}^s \in X_i} w_{kl}^s$$

for the image $X_i$;
　　　　B) Update the weights $$w_{kl}^S = \frac{\pi_i}{\omega_S} w_{kl}^S$$

for $z_{lk}^s \in X_i$.
　vi) Set $s_t = s^*$ and $h_{k,t}^{s_t} = h_{k,t}^{s^*}$, and add $h_{k,t}^{s_t}$ to the k-th category classifier, $H_k = \{h_{k,1}^{s_1}, \ldots, h_{k,t}^{s_t}\}$.
2. Concatenate all the generated weak classifiers to generate a visual vocabulary $D_h = \{h_{k,t}^{s_t}\}$, k=1, ..., C; t=1, ..., T.
3. Output: the visual vocabulary $D_h$ that includes T×C classifiers $\{h_{k,t}^{s_t}\}$ and/or a second visual vocabulary $D_I$ that includes ≤T×C bucket functions.

In these embodiments various types of features are given the same significance. However, in some circumstances these embodiments may over-select certain types of features, so that other types of features are ignored. This may dramatically increase the chance of over-fitting. Assume a prior distribution of the significance $\{p_s\}_{s=1}^S$ for the S feature types. Some embodiments include a sampling mechanism to select which type of features to minimize in each iteration, instead of searching for all the types of features. In these embodiments the systems and methods perform the following:

1. Do for t=1, . . . , T:
   1.1 Do for k=1, . . . , C:
   i) Randomly select a feature type s* at a sampling rate of $\{p_s\}_{s=1}^S$.
   ii) Train a weak classifier $h_{k,t}^{s*}$ for the task $G_k^{s*}$ by minimizing equation (2) with the weight distribution $W_k^{s*}$ associated with the task.
   iii) Apply $h_{k,t}^{s*}$ to equations (11)(12) to update its corresponding weight distribution $W_k^{s*}$.
   iv) Generate an image-level weight distribution from $W_k^{s*}$, $$\pi_i = \sum_{z_{kl}^{s*} \in X_i} w_{kl}^{s*},$$
$$i = 1, \ldots, N,$$

where $\pi_i$ is the weight for the image $X_i$ evaluated based on the current optimal feature type s*.

v) Update the weight distributions for other feature types s≠s* by propagating $\pi_i$:
      a. Do for i=1, . . . , N:
         1) Do for s=1, . . . S, where s≠s*:
            A) Compute $$\omega_S = \sum_{z_{kl}^s \in X_i} w_{kl}^S$$

for the image $X_i$;
            B) Update the weights, $$w_{kl}^S = \frac{\pi_i}{\omega_s} w_{kl}^S,$$

for $z_{kl}^s \in X_i$.
   vii) Set $s_t = s*$ and $h_{k,t}^{s_t} = h_{k,t}^{s*}$, and add $h_{k,t}^{s_t}$ to the k-th category classifier $H_k = \{h_{k,1}^{s_1}, \ldots, h_{k,t}^{s_t}\}$.

2. Concatenate all the generated weak classifiers to generate a visual vocabulary $D_h = \{h_{k,t}^{s_t}\}$, k=1, . . . , C; t=1, . . . , T.
3. Output the visual vocabulary $D_h$ that includes T×C classifiers $\{h_{k,t}^{s_t}\}$ and/or a second visual vocabulary $D_I$ that includes ≤T×C bucket functions.

Thus, multiple sets of features $\{z_1^s, \ldots, z_{M^s}^s\}_{s=1}^S$ in an image can be encoded with the first visual vocabulary $D_h$ to generate a T×C dimensional vector with elements obtained according to $$f_{k,t} = \frac{1}{M^{s_t}} \sum_{m=1}^{M^{s_t}} h_{k,t}^{s_t}(z_m^{s_t}),$$

where k=1, . . . , C and t=1, . . . , T. Also, the features can be encoded with the second vocabulary $D_I$ into a $|D_I|$×1 dimensional array.

Therefore, some embodiments of the systems and methods described herein select a subset of buckets from the intermediate vocabulary $V_I$ that most efficiently classify the C labels of the training samples, and train classifiers for the labels that use bucket values as respective inputs.

Figure 12:
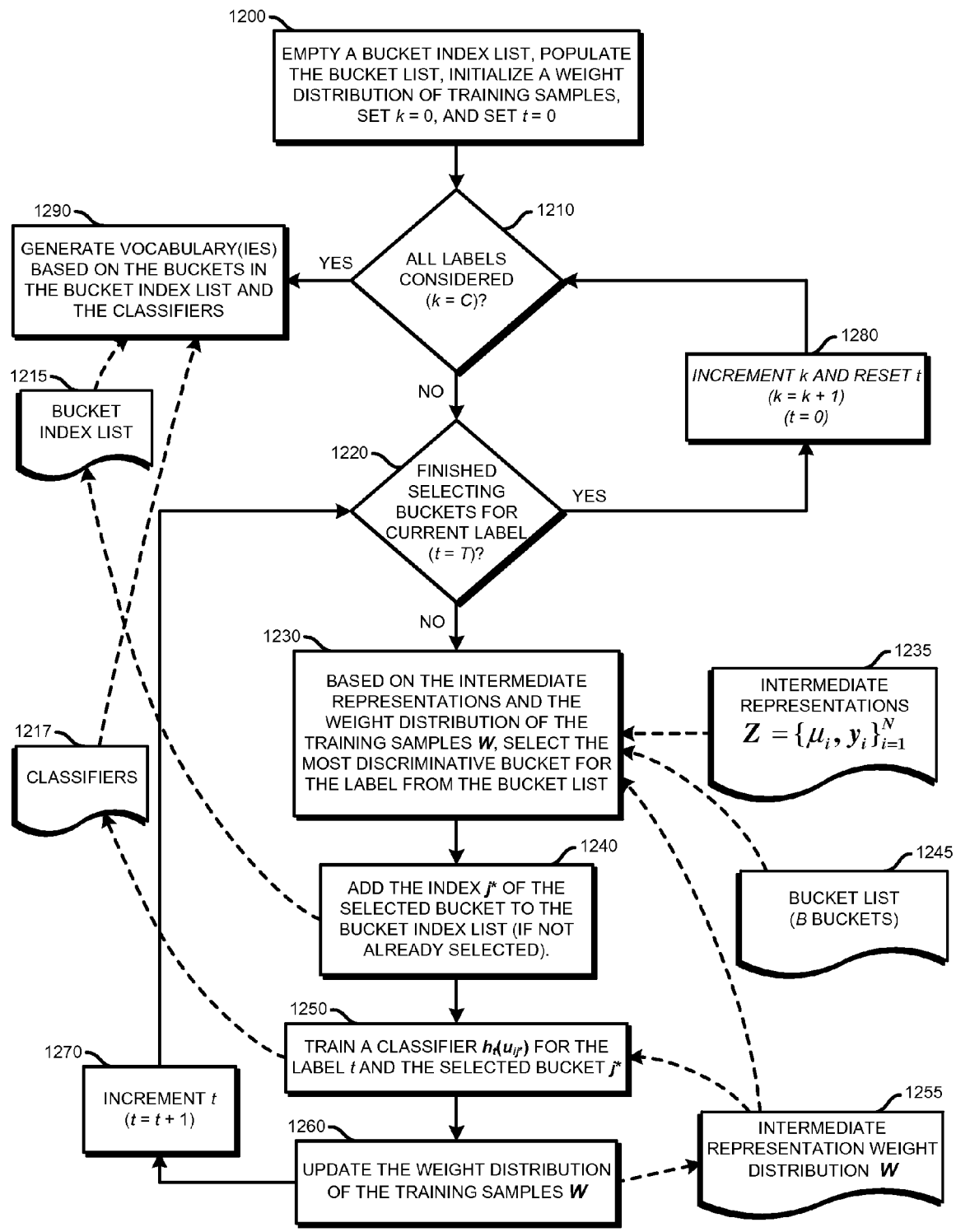
FIG. 12 illustrates an example embodiment of a method for selecting a subset of buckets.

FIG. 12 illustrates an example embodiment of a method for selecting a subset of buckets. The flow starts in block 1200, where a bucket index list 1215 is emptied, a weight distribution W 1255 of the intermediate representations 1235 is initialized (e.g., the intermediate representation of each image is assigned a weight), a bucket list 1245 is populated with all B buckets, a label count k is set to 0, and a bucket count t is set to 0. Also, a total number of labels C is determined (for example, by counting all of the labels associated with the labeled intermediate representations 1235), and a total number of buckets per label T is determined (for example, in various embodiments, based on received user input, based on a desired vocabulary length, based on a statistical analysis of vocabulary length, based on discriminative effectiveness, based on heuristic techniques, etc.). C and T are assumed to be greater than zero.

Next, flow proceeds to block 1210, where it is determined (e.g., by a computing device) if all labels have been considered. If yes (k=C), the flow proceeds to block 1290. If not (k<C), the flow proceeds to block 1220, which happens at least the first time the flow reaches block 1210. In block 1220, it is determined if bucket selection for the current label is finished. If yes (t=T), then the flow proceeds to block 1280. If not (t<T), then the flow proceeds to block 1230, which happens at least the first time the flow reaches block 1220.

In block 1230, based on the labeled intermediate representations 1235, the optimal bucket $u_{ij*}$ for the current label c is selected from the bucket list 1245, for example based on equation (2) using the weight distribution W 1255. Next, in block 1240, the index j* of the selected bucket $u_{ij*}$ is added to the bucket index list 1215. In some embodiments the index j* is added only if it is not already included in the bucket index list 1215. The flow then proceeds to block 1250, where a weak classifier $h_t(u_{ij*})$ is trained for the label t and the selected bucket j*, for example for the task $G_k$ by minimizing equation (2) with the weight distribution $W_k$ associated with the task. The weak classifier $h_t(u_{ij*})$ is added to a set of classifiers 1217.

Then in block 1260, the weight distribution W 1255 is updated, for example based on equations (11)-(12). Thus, the weight distribution W 1255 of the intermediate representations 1235 may be different for any subsequent iterations of blocks 1230-1260.

Next, in block 1270, t is incremented (t=t+1), and flow then returns to block 1220. If, in block 1220, bucket selection for the current label k is determined to be finished (t=T), the flow proceeds to block 1280, where k is incremented (k=k+1) and t is reset to 0 (t=0). The flow then returns to block 1210. If in block 1210 all labels are determined to have been considered (k=C), then the flow proceeds to block 1290, where one or more vocabularies are generated based on the buckets listed in the bucket index list 1215 (e.g., the associated bucket functions of the buckets indicated by the bucket index list 1215 are added to a vocabulary $D_I$) and/or on the classifiers in the set of classifiers 1217 (e.g., the classifiers are added to a vocabulary $D_h$).

Figure 13:
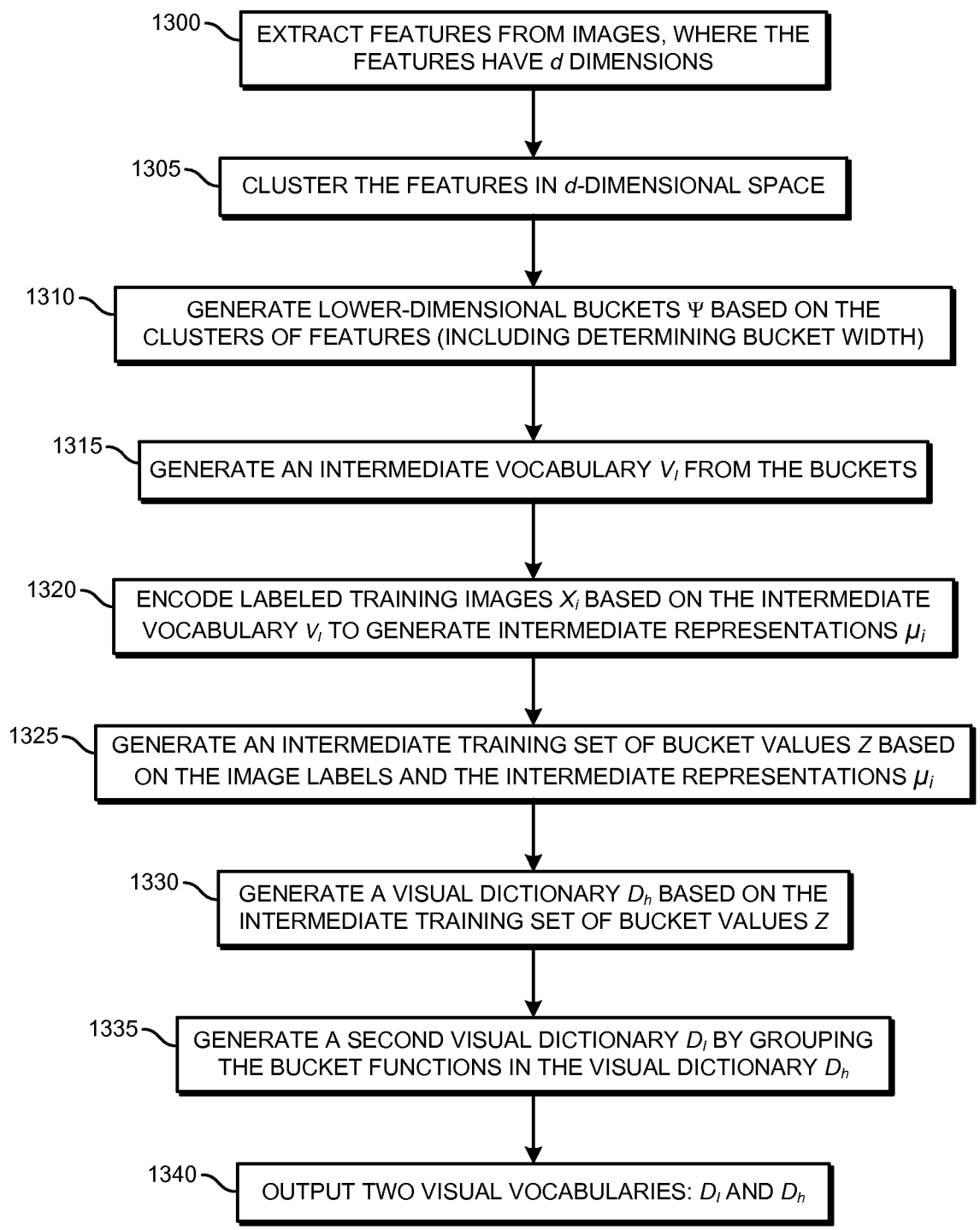
FIG. 13 illustrates an example embodiment of a method for generating a visual vocabulary.

FIG. 13 illustrates an example embodiment of a method for generating a visual vocabulary. The blocks shown, block 1300-1340, may be performed for each s=1, . . . , S (where S is the total number of feature types). In block 1300, features are extracted from images (either labeled or unlabeled). The features have d dimensions. Next, in block 1305, are clustered in d-dimensional space. For example, some embodiments perform K-means clustering on the extracted features $\{z_l^s\}_{l=1}^{L^s}$ to get $K^s$ cluster centers $\{\partial_k^s\}_{k=1}^{K^s}$, each of which has $d^s$ dimensions. The flow then proceeds to block 1310, where lower-dimensional buckets $\Psi$ are generated based on the clusters of features. Bucket generation may include determining the respective widths of the buckets. Next, in block 1315, an intermediate vocabulary $V_I$ is generated from the buckets. For example, in some embodiments, for $k=1, \ldots, K^s$, $J^s$ buckets $\Psi_k^s$ are selected using equations (b1)-(b2), the selected buckets $\Psi_s = \{\Psi_k^s\}_{k=1}^{K^s}$ are grouped, and all the bucket functions of the selected buckets are added to an intermediate visual vocabulary $V_I = \{\Psi^s\}_{s=1}^{S}$.

The flow then moves to block 1320, where labeled training images $X_i$ are encoded based on the intermediate vocabulary $V_I$ to generate intermediate representations $\mu_i$, for example using equations (1c)-(1d). Then, in block 1325, an intermediate training set $Z = \{\mu_i, y_i\}_{i=1}^{N}$ is generated from the intermediate representations $\mu_i$ and the labels $y_i$. For each image i, Z includes the respective image labels $y_i$ and the respective intermediate representations $p_i$. Next, in block 1330, a visual vocabulary $D_h = \{h_{k,t}\}$, $k=1, \ldots, C$; $t=1, \ldots, T$ is generated based on Z, for example by training weak classifiers $h_{k,t}$ based on Z, and the visual vocabulary $D_h$ includes T×C weak classifiers. Each weak classifier $h_{k,t}$ generates a label score and is associated with a respective bucket (e.g., an output of the associated bucket function $b(z,\theta)$ is used as an input to the weak classifier $h_{k,t}$). Flow then moves to block 1335, where a second visual vocabulary $D_I$, which is a subset of the intermediate vocabulary $V_I$, is generated by selecting the buckets functions that are associated with the weak classifiers in $D_h$ and removing duplicates. Finally, in block 1340, two visual vocabularies, $D_I$ and $D_h$, are output.

Multiple sets of features $\{z_1^s, \ldots, z_{M^s}^s\}_{s=1}^{S}$ extracted from an image X can be encoded with $D_I$ to get a $|D_I| \times 1$ dimensional representation $\hat{\mu}$. Then $\hat{\mu}$ can be further encoded with $D_h$ to get a representation in the form of a T×C dimensional vector, $[h_{1,1}(\hat{\mu}), \ldots, h_{k,t}(\hat{\mu}), \ldots, h_{c,T}(\hat{\mu})]$, $k=1, \ldots, C$; $t=1, \ldots, T$. Both of the representations can be used to classify an image X. For example, $\hat{\mu}$ may be used for a fast comparison of features/images, and $[h_{1,1}(\hat{\mu}), \ldots, h_{k,t}(\hat{\mu}), \ldots, h_{C,T}(\hat{\mu})]$ can be used to determine which labels apply to the encoded features/images.

Figure 14:
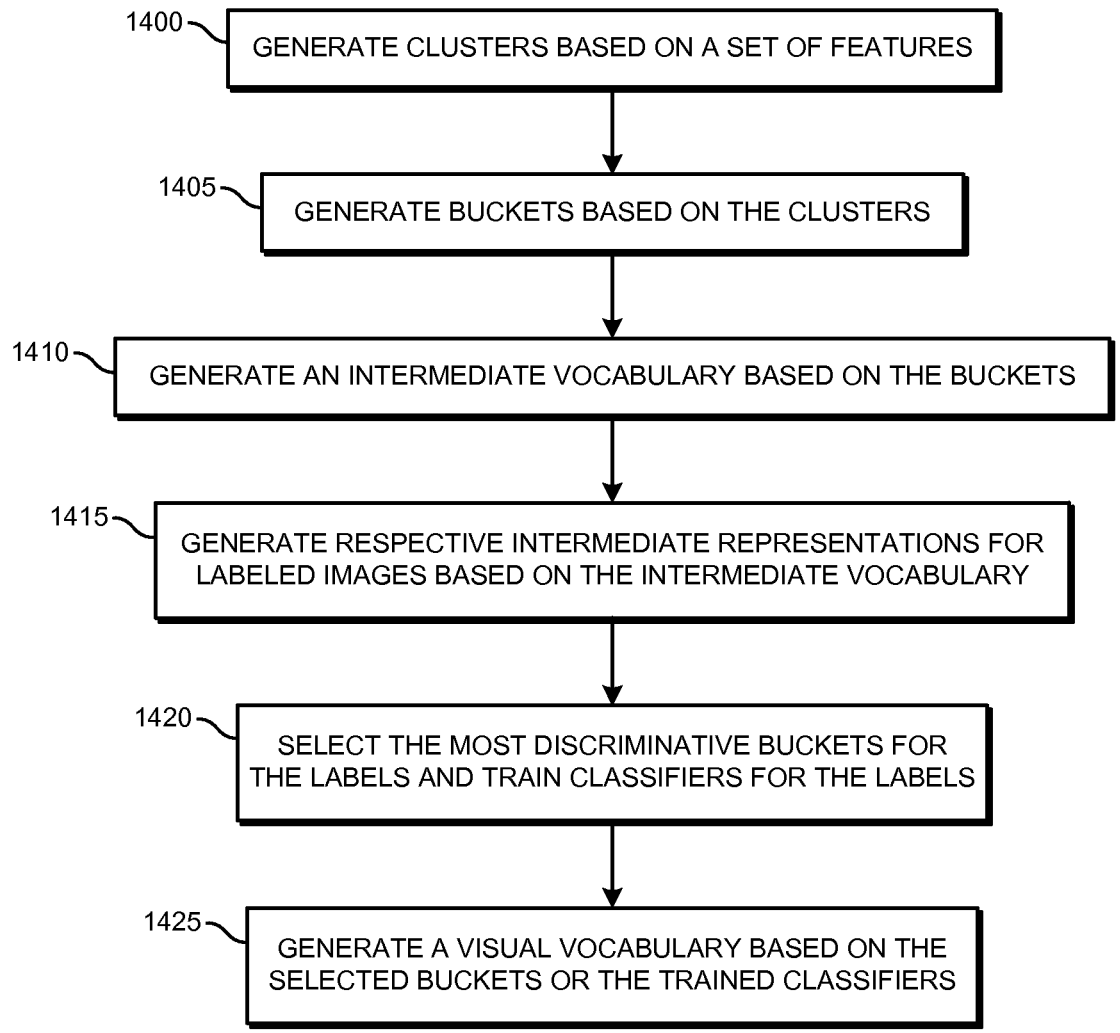
FIG. 14 illustrates an example embodiment of a method for generating a visual vocabulary.

FIG. 14 illustrates an example embodiment of a method for generating a visual vocabulary. The flow starts in block 1400, where clusters are generated based on a set of features (e.g., features extracted from a set of images). Next, in block 1405, buckets and corresponding bucket functions are generated based on the clusters, and, in block 1410, an intermediate vocabulary is generated based on the buckets and the bucket functions. In some embodiments, blocks 1400-1410 are performed as illustrated by FIG. 4. The flow then proceeds to block 1415, where respective intermediate representations for labeled images are generated based on the intermediate vocabulary, for example as illustrated by FIG. 6. The flow then moves to block 1420, where the buckets that are discriminative of the labels are selected and where classifiers are trained for the labels, and then, in block 1425, a visual vocabulary is generated based on the selected buckets and/or the trained classifiers. In some embodiments blocks 1420-1425 are performed as illustrated by FIG. 12, FIG. 13, or a combination of both.

Figure 15:
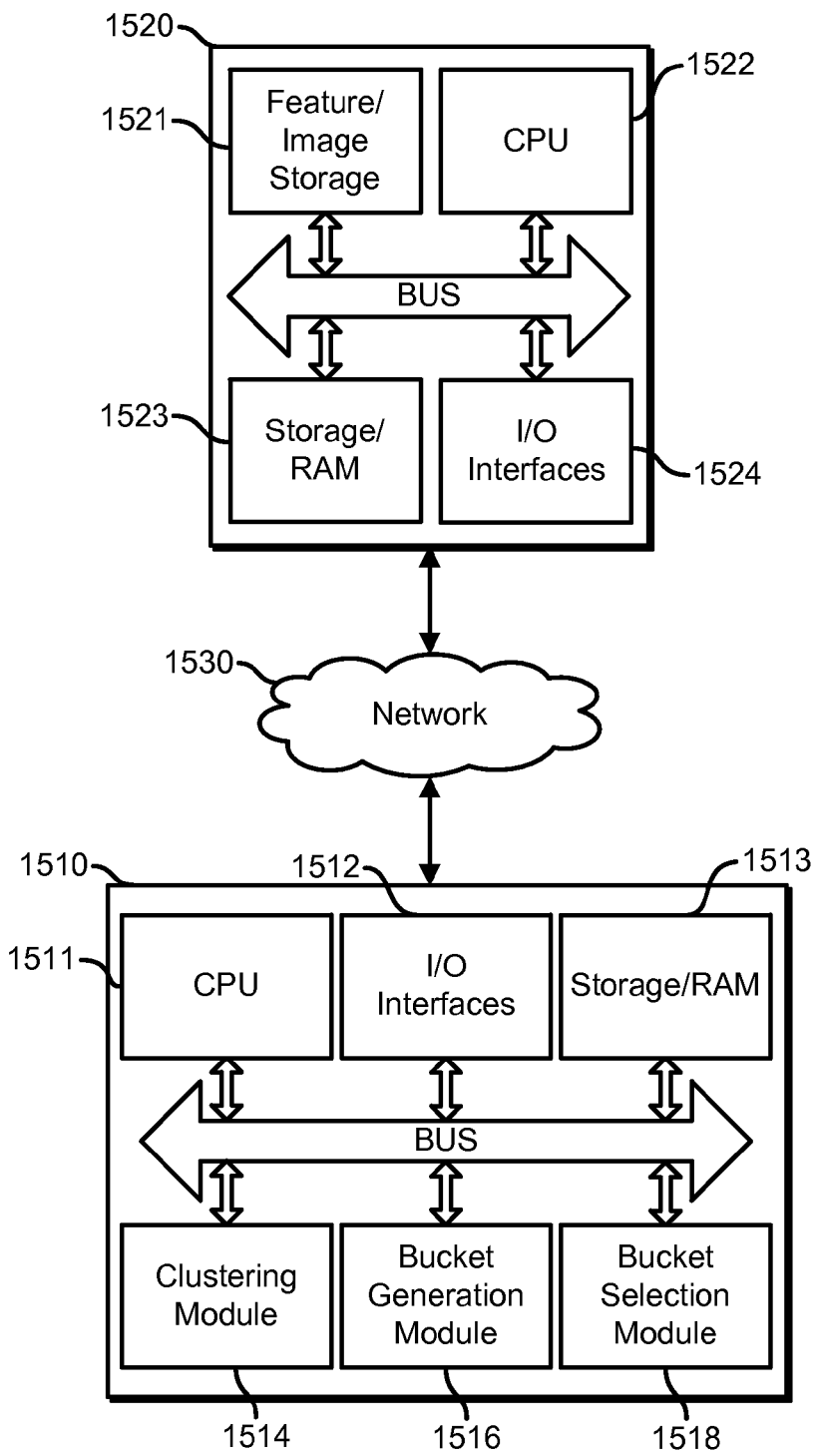
FIG. 15 is a block diagram that illustrates an example embodiment of a system for generating a visual vocabulary.

FIG. 15 is a block diagram that illustrates an example embodiment of a system 1500 for generating a visual vocabulary. The system includes a vocabulary generation device 1510 and an object storage device 1520, both of which include one or more computing devices (e.g., a desktop computer, a server, a PDA, a laptop, a tablet, a smart phone). The vocabulary generation device 1510 includes one or more processors (CPU) 1511, I/O interfaces 1512, and storage/RAM 1513. The CPU 1511 includes one or more central processing units (e.g., microprocessors) and is configured to read and perform computer-executable instructions, such as instructions stored in the modules. The computer-executable instructions may include those for the performance of the methods described herein. The I/O interfaces 1512 provide communication interfaces to input and output devices, which may include a keyboard, a display, a mouse, a printing device, a touch screen, a light pen, an optical storage device, a scanner, a microphone, a camera, a drive, and a network (either wired or wireless).

Storage/RAM 1513 includes one or more computer readable and/or writable media, and may include, for example, a magnetic disk (e.g., a floppy disk, a hard disk), an optical disc (e.g., a CD, a DVD, a Blu-ray), a magneto-optical disk, a magnetic tape, semiconductor memory (e.g., a non-volatile memory card, flash memory, a solid state drive, SRAM, DRAM), an EPROM, an EEPROM, etc. Storage/RAM 1513 may store computer-readable data and/or computer-executable instructions. The components of the vocabulary generation device 1510 communicate via a bus.

The vocabulary generation device 1510 also includes a clustering module 1514, a bucket generation module 1516, and a bucket selection module 1518. Modules may include logic, computer-readable data, and/or computer-executable instructions and may be implemented in software (e.g., Assembly, C, C++, C#, Java, BASIC, Perl, Visual Basic), firmware, and/or hardware, and modules are stored on one or more computer-readable media. In some embodiments, the vocabulary generation device 1510 includes additional or less modules, the modules are combined into fewer modules, or the modules are divided into more modules. Though the computing device or computing devices that execute a module actually perform the operations, for purposes of description a module may be described as performing one or more operations. The clustering module 1514 includes computer-executable instructions that may be executed to cause the vocabulary generation device 1510 to generate feature clusters in a native dimensional space based on one or more sets of features and/or form generative visual vocabularies from the sets of features. The bucket generation module 1516 includes computer-executable instructions that may be executed to cause the vocabulary generation device 1510 to generate buckets and respective bucket functions based on the feature clusters and generate an intermediate vocabulary from the buckets. Also, the bucket selection module 1518 includes computer-executable instructions that may be executed to cause the vocabulary generation device 1510 to encode labeled images according to the intermediate vocabulary; determine the buckets that are discriminative of the labels; train classifiers for the buckets and labels; and/or generate one or more revised vocabularies (e.g., $D_I$ and $D_h$) based on the classifiers, the buckets, and/or the bucket functions. Therefore, the clustering module 1514, the bucket generation module 1516, and/or the bucket selection module 1518 may be executed by the vocabulary generation device 1510 to cause the vocabulary generation device 1510 to perform the methods described herein.

The object storage device 1520 includes a CPU 1522, storage/RAM 1523, and I/O interfaces 1524. The object storage device also includes feature/image storage 1521. Feature/image storage 1521 includes a computer-readable medium that stores features, images, and/or labels thereon. The members of the object storage device 1520 communicate via a bus. The vocabulary generation device 1510 may retrieve features and images from the feature/image storage 1521 in the object storage device 1520 via a network 1530.

Figure 16A:
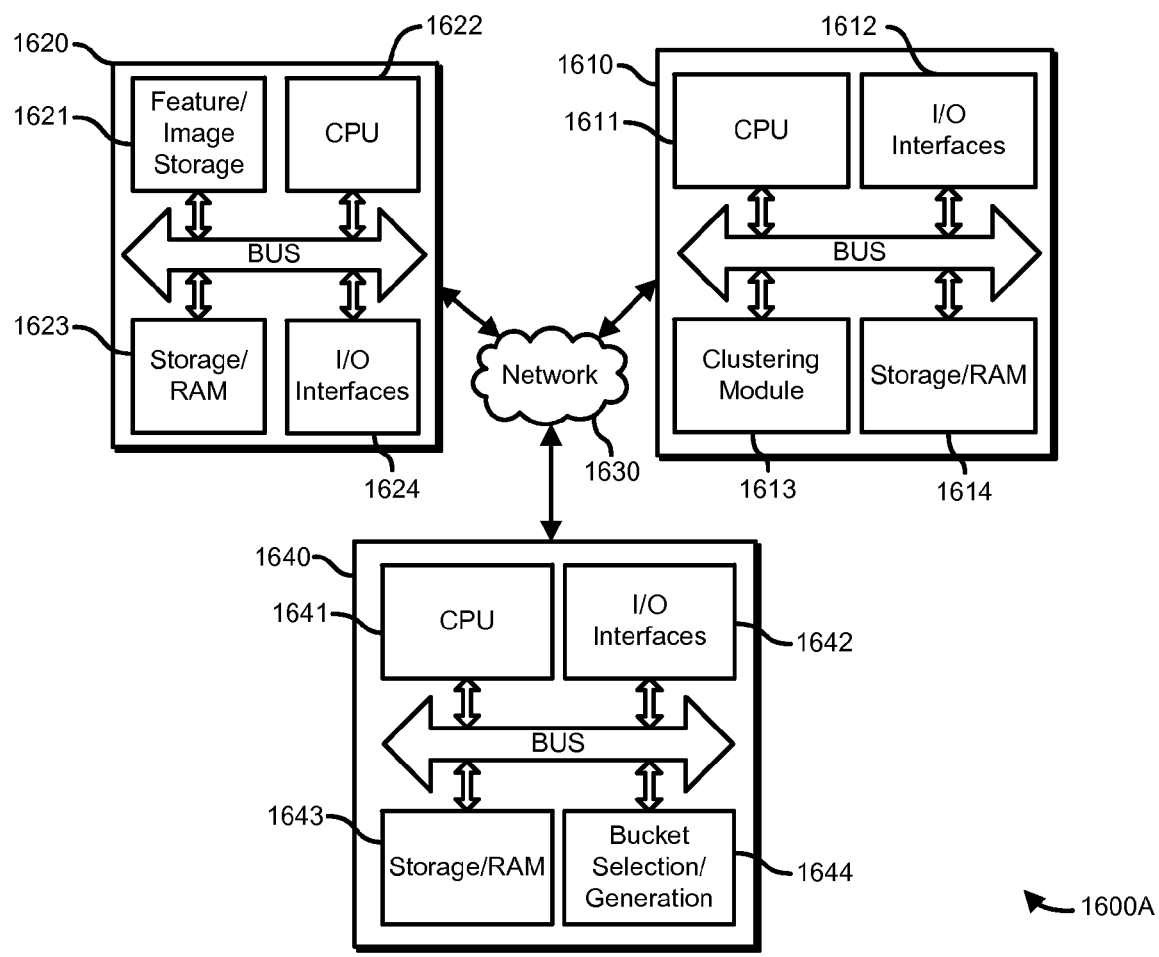
FIG. 16A is a block diagram that illustrates an example embodiment of a system for generating a visual vocabulary.

FIG. 16A is a block diagram that illustrates an example embodiment of a system 1600A for generating a visual vocabulary. The system 1600A includes a clustering device 1610, an object storage device 1620, and a bucket selection device 1640. The clustering device 1610 includes a CPU 1611, I/O interfaces 1612, a clustering module 1613, and storage/RAM 1614. When executed, the clustering module 1613 generates feature clusters based on one or more sets of features and/or forms generative visual vocabularies based on the sets of features. The object storage device 1620 includes a CPU 1622, I/O interfaces 1624, feature/image storage 1621, and storage/RAM 1623. The bucket selection device 1640 includes a CPU 1641, I/O interfaces 1642, storage/RAM 1643, and a bucket selection/generation module 1644, which combines the instruction in the bucket selection module 1518 and the bucket generation module 1516 shown in FIG. 15. The components of each of the devices communicate via a respective bus. In the embodiment shown in FIG. 16A, the clustering device 1610 generates feature clusters using the clustering module 1613, and the bucket selection device 1640 generates revised visual vocabularies using the bucket selection/generation module 1644. The bucket selection device 1640, the clustering device 1610, and the object storage device 1620 communicate via a network 1630 to collectively access the features and/or images in the feature/image storage 1621, cluster the features, generate buckets from the clusters, select the buckets that are discriminative of labels, and train classifiers. Thus, in this embodiment, different devices may store the features/images, cluster the features, generate the buckets, select the discriminative buckets, and train classifiers.

Figure 16B:
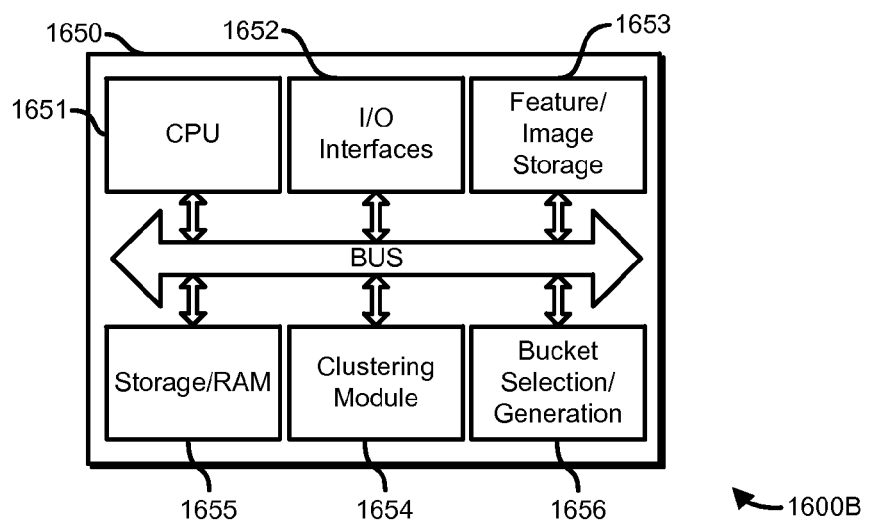
FIG. 16B is a block diagram that illustrates an example embodiment of a system for generating a visual vocabulary.

FIG. 16B is a block diagram that illustrates an example embodiment of a system 1600B for generating a visual vocabulary. The system includes a vocabulary generation device 1650 that includes a CPU 1651, I/O interfaces 1652, feature/image storage 1653, a clustering module 1654, storage/RAM 1655, and a bucket selection/generation module 1656. The members of the vocabulary generation device 1650 communicate via a bus. Therefore, in the embodiment shown in FIG. 16B, one computing device stores the features/images, clusters features, composes generative vocabularies, generates bucket functions, generates intermediate vocabularies, encodes labeled images based on intermediate vocabularies, determines buckets that are discriminative of labels, trains classifiers, and generates revised visual vocabularies. However, other embodiments may organize the components differently than the example embodiments shown in FIG. 15, FIG. 16A, and FIG. 16B.

Figure 17:
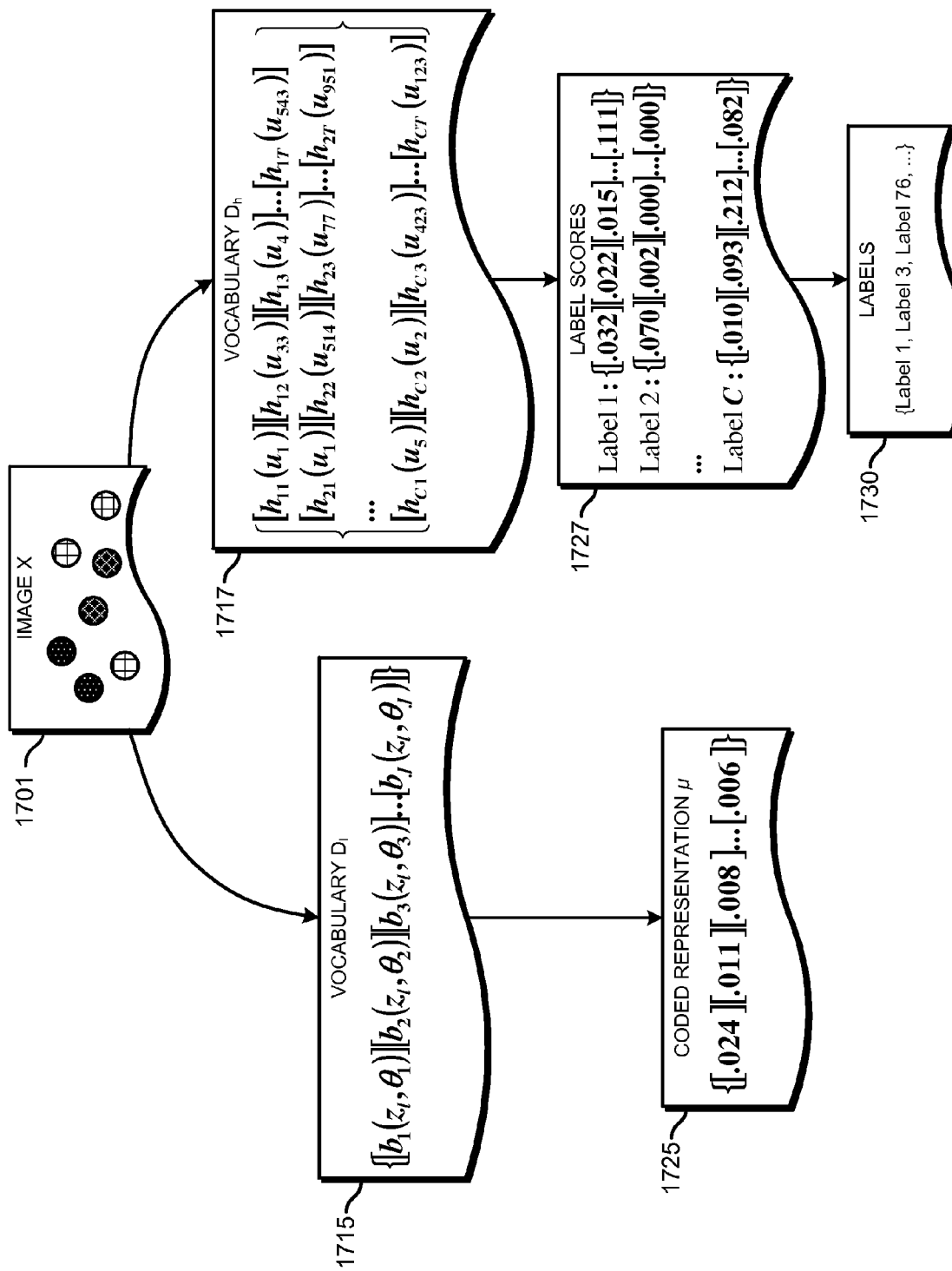
FIG. 17 illustrates an example embodiment of an image that is encoded according to different vocabularies.

FIG. 17 illustrates an example embodiment of an image 1701 that is encoded (e.g., described) according to different vocabularies, a first vocabulary $D_I$ 1715 and a second vocabulary $D_h$ 1717. The image 1701 may be encoded according to the first vocabulary $D_I$ 1715 (which includes bucket functions for J buckets) to generate a coded representation μ 1725, which represents the features in the image as bucket values a fixed-length vector.

Also, the image 1701 may be encoded according to the second vocabulary $D_h$ 1717 (which includes classifiers trained for respective labels) to generate label scores 1727. The label scores 1727 may be used to determine the labels 1730 (e.g., "dog", "car", "tree") to apply to the image 1701. For example, the scores for a label may indicate a probability that the associated label applies to the image. When determining if a label applies to the image 1701, the associated scores may be summed, examined against respective thresholds, and/or used as inputs to other functions.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems and/or devices perform the operations of the above-described embodiments when implementing the computer-executable instructions. Also, an operating system on the one or more systems and/or devices may implement the operations of the above described embodiments. Thus, the computer-executable instructions and/or the one or more computer-readable media that store the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be stored on a computer-readable medium provided on a function-extension board inserted into the device or on a function-extension unit connected to the device, and a CPU provided on the function-extension board or unit may implement the operations of the above-described embodiments.

The scope of the claims is not limited to the above-described explanatory embodiments and includes various modifications and equivalent arrangements.

What is claimed is:

1. A method for building a visual vocabulary, the method comprising:
generating visual words based on a set of features, wherein the visual words are defined in a higher-dimensional space;
projecting the visual words from the higher-dimensional space to a first lower-dimensional space, thereby producing projections of the visual words in the first lower-dimensional space;
generating a first collection of buckets in the first lower-dimensional space based on the projections of the visual words in the first lower-dimensional space;
projecting the visual words from the higher-dimensional space to a second lower-dimensional space, thereby producing projections of the visual words in the second lower-dimensional space;
generating a second collection of buckets in the second lower-dimensional space based on the projections of the visual words in the second lower-dimensional space; and
iteratively selecting a sub-collection of buckets from the first collection of buckets and from the second collection of buckets, wherein bucket selection during any iteration after an initial iteration is based at least in part on feedback from previously selected buckets.

2. The method of claim 1, further comprising combining the buckets of the sub-collection of buckets to build a visual vocabulary.

3. The method of claim 1, wherein prior probabilities about types of features in the set of features are used to guide the selecting of the sub-collection of buckets.

4. The method of claim 1, wherein the visual words are generated using K-means clustering, and each cluster represents a visual word.

5. The method of claim 1, wherein the generating of the first collection of buckets in the first lower-dimensional space is further based on a purity measure.

6. The method of claim 1, further comprising generating labeled image representations based on the first collection of buckets, on the second collection of buckets, and on labeled images, wherein labels that are associated with an image are associated with a respective labeled image representation of the image.

7. The method of claim 6, wherein iteratively selecting the sub-collection of buckets from the first collection of buckets and from the second collection of buckets further includes iteratively selecting buckets that are most discriminative of the labels based on the labeled image representations, and wherein the method further comprises training respective classifiers for the labels based on the selected buckets that are most discriminative of the labels.

8. The method of claim 7, wherein the sub-collection of buckets is selected with AdaBoost learning.

9. One or more non-transitory computer-readable media storing instructions that, when executed by one or more computing devices, cause the computing devices to perform operations comprising:
clustering features from one or more images to form feature clusters, wherein the features and the feature clusters are defined in a higher-dimensional space;
projecting the feature clusters from the higher-dimensional space to a first lower-dimensional space to form projections of the feature clusters in the first lower-dimensional space;
projecting the feature clusters from the higher-dimensional space to a second lower-dimensional space to form projections of the feature clusters in the second lower-dimensional space; and
generating buckets in the first lower-dimensional space and in the second lower-dimensional space based on the projections of the feature clusters in the first lower-dimensional space and on the projections of the feature clusters in the second lower-dimensional space.

10. The one or more non-transitory computer readable media of claim 9, wherein the operations further comprise generating respective classifiers for one or more labels based on the buckets in the first lower-dimensional space and in the second lower-dimensional space, wherein a classifier maps a feature to a label.

11. The one or more non-transitory computer readable media of claim 10, wherein the operations further comprise:
selecting optimal buckets that are associated with a first label; and
training classifiers for the first label based on the selected optimal buckets that are associated with the first label.

12. The one or more non-transitory computer readable media of claim 11, wherein the operations further comprise:
selecting optimal buckets that are associated with a second label; and
training classifiers for the second label based on the selected optimal buckets that are associated with the second label.

13. The one or more non-transitory computer readable media of claim 12, wherein the operations further comprise adding the classifiers for the first label and the classifiers for the second label to a visual vocabulary.

14. The one or more non-transitory computer readable media of claim 9, wherein the buckets are generated further based on a purity measure.

15. The one or more non-transitory computer readable media of claim 9, wherein a bucket is associated with a respective bucket function $$b_{k,j}^s(z_l^s, \theta_{k,j}^s) = \begin{cases} 1, & \text{if } |z_{l,j}^s - \partial_{k,j}^s| < \theta_{k,j}^s \\ 0, & \text{otherwise,} \end{cases}$$

for $j \in \{1, \ldots, d^s\}$, where z is a set of low-level features, s is the feature type, $d^s$ is the dimension of the respective feature space, k is the cluster number, $\partial$ is a cluster center, and $\theta$ is a width of the bucket.

16. A device for building a visual vocabulary, the device comprising:
a computer memory; and
one or more processors that are coupled to the computer memory and that are configured to cause the device to
generate visual words based on a plurality of features, wherein the visual words are defined in a higher-dimensional space,
project the visual words from the higher-dimensional space to a first lower-dimensional space, thereby producing projections of the visual words in the first lower-dimensional space,
generate a first collection of buckets in the first lower-dimensional space based on the projections of the visual words in the first lower-dimensional space,
project the visual words from the higher-dimensional space to a second lower-dimensional space, thereby producing projections of the visual words in the second lower-dimensional space,
generate a second collection of buckets in the second lower-dimensional space based on the projections of the visual words in the second lower-dimensional space, and
iteratively select a sub-collection of buckets from the first collection of buckets and from the second collection of buckets, wherein bucket selection during any iteration after an initial iteration is based at least in part on feedback from previously selected buckets.

17. The device of claim 16, wherein the one or more processors are further configured to cause the device to generate labeled image representations based on the first collection of buckets, on the second collection of buckets, and on labeled images, wherein labels that are associated with an image are associated with a respective labeled image representation of the image.

18. The device of claim 17, wherein, to iteratively select the sub-collection of buckets from the first collection of buckets and from the second collection of buckets, the one or more processors are further configured to cause the device to iteratively select buckets that are most discriminative of the labels based on the labeled image representations, and
wherein the one or more processors are further configured to cause the device to train respective classifiers for the labels based on the selected buckets that are most discriminative of the labels.

* * * * *